United States Patent
Tsunashima et al.

(10) Patent No.: US 12,477,227 B2
(45) Date of Patent: Nov. 18, 2025

(54) IMAGE PROCESSING DEVICE AND IMAGE PROCESSING SYSTEM

(71) Applicant: Sony Group Corporation, Tokyo (JP)

(72) Inventors: Nobuhiro Tsunashima, Kanagawa (JP); Masakazu Ebihara, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 18/269,706

(22) PCT Filed: Dec. 23, 2021

(86) PCT No.: PCT/JP2021/047894
§ 371 (c)(1),
(2) Date: Jun. 26, 2023

(87) PCT Pub. No.: WO2022/168481
PCT Pub. Date: Aug. 11, 2022

(65) Prior Publication Data
US 2024/0056686 A1    Feb. 15, 2024

(30) Foreign Application Priority Data

Feb. 2, 2021    (JP) ................. 2021-015314

(51) Int. Cl.
*H04N 23/695* (2023.01)
*G06T 7/246* (2017.01)
(Continued)

(52) U.S. Cl.
CPC .......... *H04N 23/695* (2023.01); *G06T 7/248* (2017.01); *G06V 10/761* (2022.01);
(Continued)

(58) Field of Classification Search
CPC ................................................. H04N 23/695
See application file for complete search history.

(56) References Cited

U.S. PATENT DOCUMENTS

2022/0139087 A1* 5/2022 Nakamura ........... G07G 1/0036
348/159

FOREIGN PATENT DOCUMENTS

| JP | H05-334572 A | 12/1993 |
|---|---|---|
| JP | 2003-158664 A | 5/2003 |

(Continued)

*Primary Examiner* — Jerry T Jean Baptiste
(74) *Attorney, Agent, or Firm* — Paratus Law Group, PLLC

(57) ABSTRACT

An image processing device includes: a tracking target object determination unit that determines an object targeted for tracking as a tracking target object based on a first image captured by a first image capturing unit; a tracked object information obtainment unit that obtains information for identifying a tracked object that is an object being tracked by a second image capturing unit; a determination processing unit that determines whether the tracked object and the tracking target object are a same object; and a tracking change processing unit that performs processing for changing the tracked object tracked by the second image capturing unit to the tracking target object when the tracked object and the tracking target object are determined not to be the same.

20 Claims, 16 Drawing Sheets

(51) Int. Cl.
*G06V 10/74* (2022.01)
*H04N 23/667* (2023.01)
*H04N 23/80* (2023.01)

(52) U.S. Cl.
CPC ........... *H04N 23/667* (2023.01); *H04N 23/80* (2023.01); *G06T 2207/30196* (2013.01); *G06T 2207/30224* (2013.01); *G06V 2201/07* (2022.01)

(56) References Cited

FOREIGN PATENT DOCUMENTS

| | | | |
|---|---|---|---|
| JP | 2008-507229 | A | 3/2008 |
| JP | 2012-520650 | A | 9/2012 |
| JP | 2019-129410 | A | 8/2019 |
| JP | 2019165501 | A | 9/2019 |
| JP | 2020-198468 | A | 12/2020 |

\* cited by examiner

IMAGE PROCESSING DEVICE AND IMAGE PROCESSING SYSTEM

CROSS REFERENCE TO PRIOR APPLICATION

This application is a National Stage Patent Application of PCT International Patent Application No. PCT/JP2021/047894 (filed on Dec. 23, 2021) under 35 U.S.C. § 371, which claims priority to Japanese Patent Application No. 2021-015314 (filed on Feb. 2, 2021), which are all hereby incorporated by reference in their entirety.

TECHNICAL FIELD

The present technique relates to the technical field of image processing devices and image processing systems that perform processing for tracking a specific object by linking two image capturing units.

BACKGROUND ART

When shooting a space that is relatively large, such as a sports venue or a conference room, objects such as people will appear extremely small if the overall space is shot using only a single camera. There is a further problem in that uncaptured areas, objects, and the like may arise if only one camera is used to take a close-up of an object.

A method in which at least two cameras are used is conceivable as a solution to such problems. This is, for example, a method that uses a camera which shoots an overall image along with a camera which takes a close-up of an object. For example, the technique described in PTL 1, indicated below, is a technique that uses a plurality of cameras in this manner.

PTL 1 discloses a technique in which two cameras are used, with one camera functioning as a complete-view camera that shoots an overall shooting area and the other camera functioning as a telephoto camera that shoots a close-up of an object.

CITATION LIST

Patent Literature

[PTL 1]
JP H5-334572A

SUMMARY

Technical Problem

However, there is a problem in that various types of processing are executed from when the object to be shot close-up is identified in the complete-view camera to when that object is actually brought into the angle of view of the telephoto camera, which produces a time lag and may make it impossible for the telephoto camera to capture the object.

Having been achieved in light of the foregoing circumstances and such a problem, an object of the present technique is to bring a target object into an angle of view using a plurality of image capturing devices.

Solution to Problem

An image processing device according to the present technique includes: a tracking target object determination unit that determines an object targeted for tracking as a tracking target object based on a first image captured by a first image capturing unit; a tracked object information obtainment unit that obtains information for identifying a tracked object that is an object being tracked by a second image capturing unit; a determination processing unit that determines whether the tracked object and the tracking target object are a same object; and a tracking change processing unit that performs processing for changing the tracked object tracked by the second image capturing unit to the tracking target object when the tracked object and the tracking target object are determined not to be the same.

Through this, processing for changing the tracking target is executed when the object being tracked by the second image capturing unit is different from the tracking target object, which is the target object assumed.

In the above-described image processing device, the tracked object information obtainment unit may obtain the information for identifying the tracked object from another image processing device, and the tracking change processing unit may perform processing for transmitting information on the tracking target object to the other image processing device as the processing for changing.

For example, processing for changing the tracking target is realized by exchanging information between two devices, namely the image processing device having this configuration and the other image processing device.

In the above-described image processing device, the tracking change processing unit may transmit information for changing an optical axis direction of the second image capturing unit to the other image processing device as the information on the tracking target object.

For example, the position of the tracking target object within the first image captured by the first image capturing unit (or within the angle of view of the first image capturing unit) and the setting of the optical axis direction of the second image capturing unit for capturing the tracking target object within the angle of view of the second image capturing unit can be associated one-to-one.

In particular, when the first image capturing unit and the second image capturing unit are disposed in positions close to each other, and the respective image capturing units and the object are at least a certain distance from each other, it is easy to associate the position of the tracking target object in the first image and the optical axis direction of the second image capturing unit.

In the above-described image processing device, the tracking change processing unit may lower a frequency of processing for transmitting to the other image processing device when the tracked object and the tracking target object are determined to be the same.

When the object being tracked by the second image capturing unit is the tracking target object, it is sufficient to continue tracking the object being tracked. Such processing is processing that can be executed without newly providing the information of the tracking target object.

The above-described image processing device may further include a movement direction estimation unit that estimates a movement direction of the tracking target object, and the tracking change processing unit may perform processing for transmitting the movement direction in addition to the information on the tracking target object to the other image processing device as the processing for changing.

It is assumed that the object is moving during a period from when the second image is shot by the second image capturing unit, to when the tracking target object is determined based on the first image captured by the first image capturing unit, the object being tracked by the second image capturing unit is identified as the tracked object based on information transmitted from the image processing device controlling the second image capturing unit, whether the tracking target object and the tracked object are the same object is determined, and information on the tracking target object is transmitted to another image processing device in accordance therewith. Then, by the time the second image capturing unit has finished changing the composition of the second image capturing unit in order to track the new tracking target object, the tracking target object may not already be located within the angle of view of the second image capturing unit.

In the above-described image processing device, the movement direction estimation unit may estimate the movement direction based on a past image captured by the first image capturing unit.

For example, the movement direction of the object serving as the tracking target object can be estimated by using the first image from several past frames.

In the above-described image processing device, the determination processing unit may determine whether the objects are the same using the first image selected based on a capture time of a second image, among second images captured by the second image capturing unit, from which information for identifying the tracked object is obtained.

Considering a case where the information for identifying the tracked object has been extracted based on the second image captured by the second image capturing unit, and the extracted information has been transmitted to an image processing device having this configuration, the position of the tracking target object in the first image captured after a certain length of time has passed since the second image was captured may be different from the position at the capture time of the second image. In such a situation, for example, if the tracked object is estimated by the second image capturing unit based on the newest first image, the object being tracked may be incorrectly identified in the second image capturing unit.

The above-described image processing device may further include a switching processing unit that switches between a first mode in which processing by the determination processing unit and processing by the tracking change processing unit are executed, and a second mode in which processing by the determination processing unit and processing by the tracking change processing unit are not executed.

Comparing the first mode with the second mode, it is assumed that the second mode is a simpler mode of control and also has a smaller processing load.

Specifically, compared to the first mode, in which processing for determining whether the tracking target object and the tracked object are the same object is performed, various types of information are transmitted and received in order to make that determination, and the like, the second mode is simpler processing in which only the tracking of the object being tracked continues as a result of the processing by the other image processing device and the second image capturing unit.

In the above-described image processing device, the switching processing unit may switch between the first mode and the second mode according to a movement mode of the tracking target object determined.

For example, a case where the movement direction of the tracking target object is constant or the tracking target object remains within a predetermined range, or a case where the tracking target object is moving slowly, can be said to be cases where there is little risk of losing the object being tracked due to the processing closed to the second image capturing unit and the other image processing device.

The above-described image processing device may include the first image capturing unit.

For example, the image processing device is a camera device including the first image capturing unit.

An image processing device according to the present technique includes: a tracking control unit that controls tracking of an object by a second image capturing unit using information on a tracking target object that is an object targeted for tracking determined based on a first image captured by a first image capturing unit. The tracking control unit: outputs information for identifying a tracked object that is an object being tracked; controls the tracking without changing the tracking target object when information on the tracking target object is not obtained during the control of the tracking; and performs tracking control for tracking an object identified based on newly-obtained information on the tracking target object, when the information on the tracking target object is obtained during the control of the tracking.

This makes it possible for the tracking control unit to continue the tracking by the second image capturing unit by executing simple processing when the information on the new tracking target object has not been obtained.

The above-described image processing device may further include: a reception processing unit that receives information on the tracking target object from another image processing device; and a transmission processing unit that transmits, to the other image processing device, the information for identifying the tracked object output by the tracking control unit. The tracking control unit may: control the tracking without changing the tracking target object when the information on the tracking target object is not received by the reception processing unit during the control of the tracking; and perform tracking control for tracking an object identified based on newly-obtained information on the tracking target object, when the information on the tracking target object is received by the reception processing unit during the control of the tracking.

For example, processing for continuing to track the object determined as the tracked object, processing for stopping the tracking of the tracked object, and processing for starting tracking of the newly-specified tracking target object is executed by exchanging information between two image processing devices, namely the image processing device having the present configuration and another image processing device.

In the above-described image processing device, the transmission processing unit may transmit information for identifying the tracked object each time a captured image is generated by the second image capturing unit.

This makes it possible to transmit information for identifying the tracked object to the other image processing device at a high frequency.

In the above-described image processing device, the transmission processing unit may transmit information pertaining to an optical axis direction of the second image capturing unit as the information for identifying the tracked object.

The information pertaining to the optical axis direction may be vector information that can uniquely identify the optical axis direction of the second image capturing unit in a predetermined coordinate system, or may be information such as the control amounts for the pan direction and the tilt direction corresponding one-to-one to the optical axis direction of the second image capturing unit.

For example, when the position of the tracking target object in the first image and the information pertaining to the optical axis direction of the second image capturing unit can be associated with each other in the other image processing device, the other image processing device can identify the optical axis direction of the second image capturing unit by having information pertaining to the optical axis direction, such as that described above, transmitted to the other image processing device.

In the above-described image processing device, the transmission processing unit may transmit a second image captured by the second image capturing unit as information for identifying the tracked object.

Depending on the configuration of the second image capturing unit and the devices for adjusting the orientation thereof, there are situations where the information pertaining to the optical axis direction of the second image capturing unit cannot be obtained. In such a case, the information on the second image captured by the second image capturing unit may be transmitted to the other image processing device, as in this configuration.

In the above-described image processing device, the reception processing unit may receive information on a movement direction of the tracking target object from the other image processing device, and the tracking control unit may perform control for the tracking using a predicted position of the tracking target object calculated based on a capture time of the first image and the movement direction received.

It is conceivable that the position of the tracking target object at the point in time when the tracking target object is determined based on the first image, and the position of the tracking target object at the point in time when the image processing device receives the information about the tracking target object and performs control such that the tracking target object is captured within the angle of view of the second image capturing unit, are different due to movement of the tracking target object. In such a case, the image processing device receiving information about the movement direction of the tracking target object makes it possible to estimate the current position of the tracking target object.

The above-described image processing device may further include a switching processing unit that switches between a first mode in which processing by the transmission processing unit, and processing by the tracking control unit that performs tracking control for tracking an object identified based on newly-obtained information on the tracking target object, and a second mode in which control of the tracking is continued without changing the tracking target object.

Comparing the first mode with the second mode, it is assumed that the second mode is a simpler mode of control and also has a smaller processing load.

Specifically, the processing for continuing to track the tracked object is assumed to be simpler processing, with a lighter processing load, than the processing for starting to track a new object based on information on a new tracking target object. In particular, when the tracking of a new object is started, there are cases where the new object is different from the tracking target object and the like, and in such cases, it is necessary to identify the new object again and start the tracking.

In the above-described image processing device, the switching processing unit may switch between the first mode and the second mode according to a movement mode of the tracked object tracked by the tracking control unit.

For example, when the movement direction of the tracked object is constant or remains within a predetermined range, or a case where the movement speed of the tracked object is low, it is possible to continue tracking the tracked object without obtaining information from another image processing device. In other words, such a case can be said to be a case in which there is little risk of losing the tracked object.

The above-described image processing device may include the second image capturing unit.

For example, the image processing device is a camera device including the second image capturing unit.

An image processing system according to the present technique includes: a tracking target object determination unit that determines an object targeted for tracking as a tracking target object based on a first image captured by a first image capturing unit; a tracking control unit that controls tracking of an object by a second image capturing unit using information on the tracking target object; a tracked object identification unit that identifies an object being tracked by the second image capturing unit as a tracked object based on information output by the tracking control unit; a determination processing unit that determines whether the tracking target object determined and the tracked object identified are a same object; and a tracking change processing unit that outputs, to the tracking control unit, information on the tracking target object, when the tracked object and the tracking target object are determined not to be the same. The tracking control unit performs tracking control for tracking an object identified based on newly-obtained information on the tracking target object, when information about a tracking target object is input during control of the tracking; and controls the tracking without changing the tracking target object when information on the tracking target object is not input during the control of the tracking.

The various operations described above can also be achieved through such an image processing system.

DESCRIPTION OF EMBODIMENTS

Hereinafter, embodiments according to the present technique will be described in the following order with reference to the accompanying drawings.
<1. Configuration of Image Capturing System>
<2. Configuration of Information Processing Device>
<3. Functional Configuration of Each Processing Unit>
<4. Flowcharts>
<4-1. Flowchart of Processing Executed by First Processing Unit>
<4-2. Flowchart of Processing Executed by Second Processing Unit>
<5. Second Embodiment>
<6. Third Embodiment>
<7. Fourth Embodiment>
<8. Fifth Embodiment>
<9. Variations>
<10. Conclusion>
<11. Present Technique>

1. Configuration of Image Capturing System

An image capturing system 1 of the present embodiment is constituted by at least two cameras. The following will describe an example in which the image capturing system 1 is configured including two cameras: a wide-angle camera 2 for capturing a complete view, and a telephoto camera 3 for capturing a zoomed-in image of an object. However, the present technique is not limited thereto, and can be applied to an image capturing system including at least three cameras.

Figure 1:
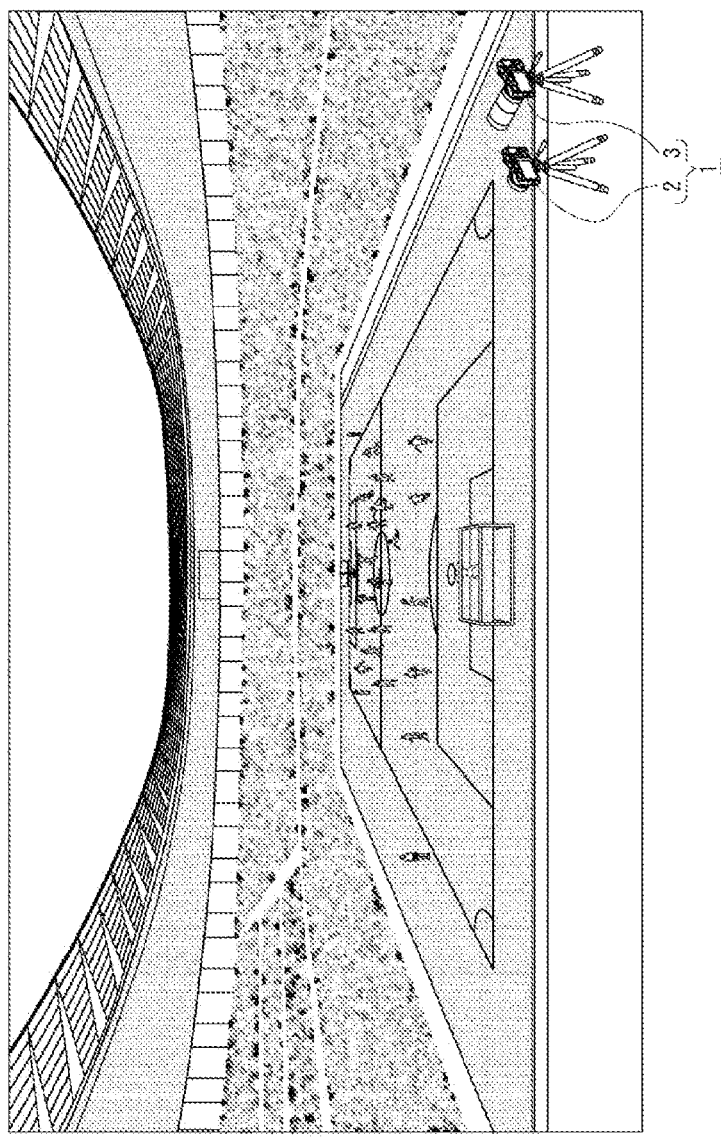
FIG. 1 is a schematic diagram illustrating a soccer field being captured by an image capturing system according to the present technique.

As illustrated in FIG. 1, the image capturing system 1 is constituted by the wide-angle camera 2, which captures an entire soccer field, and the telephoto camera 3, which captures a zoomed-in image of an individual player.

Figure 2:
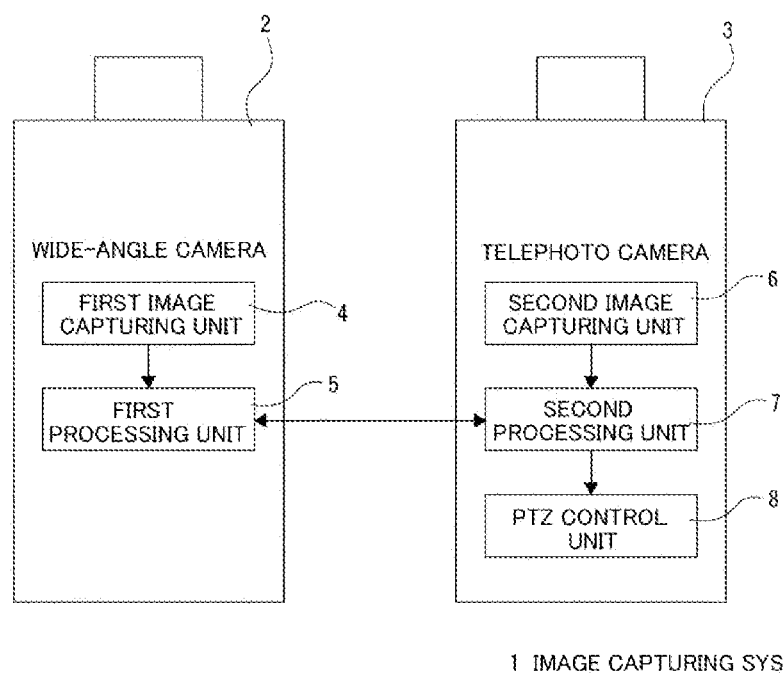
FIG. 2 is a block diagram illustrating an example of the configuration of an image capturing system.

As illustrated in FIG. 2, the wide-angle camera 2 includes a first image capturing unit 4, which is constituted by an optical imaging system, an image sensor, and the like, and a first processing unit 5, which performs various types of processing using captured images output from the first image capturing unit 4 and information transmitted from the telephoto camera 3.

The wide-angle camera 2 is operated as a fixed camera in which after the composition is initially adjusted, pan control, tilt control, and zoom control are not performed and the composition is not changed. However, some pan control, tilt control, zoom control, and the like may be executed in the wide-angle camera 2 in accordance with the position of an object of interest or the like.

Adjustments may also be made to change the composition during pauses in the game or the like.

As illustrated in FIG. 2, the telephoto camera 3 includes a second image capturing unit 6, which is constituted by an optical imaging system, an image sensor, and the like; a second processing unit 7, which performs various types of processing for performing tracking control using the second image capturing unit 6; and a PTZ control unit 8, which performs pan (P) control, tilt (T) control, and zoom (Z) control of the telephoto camera 3.

The telephoto camera 3 also includes a platform (not shown) as the target of the control by the PTZ control unit 8. In other words, the PTZ control unit 8 controls the attitude of the platform by performing pan control and tilt control, and controls the position of the zoom lens provided in the telephoto camera 3 by performing zoom control.

2. Configuration of Information Processing Device

The wide-angle camera 2 can be treated as an information processing device provided with various functions as the first processing unit 5. The telephoto camera 3 can be treated as an information processing device provided with various functions as the second processing unit 7.

Figure 3:
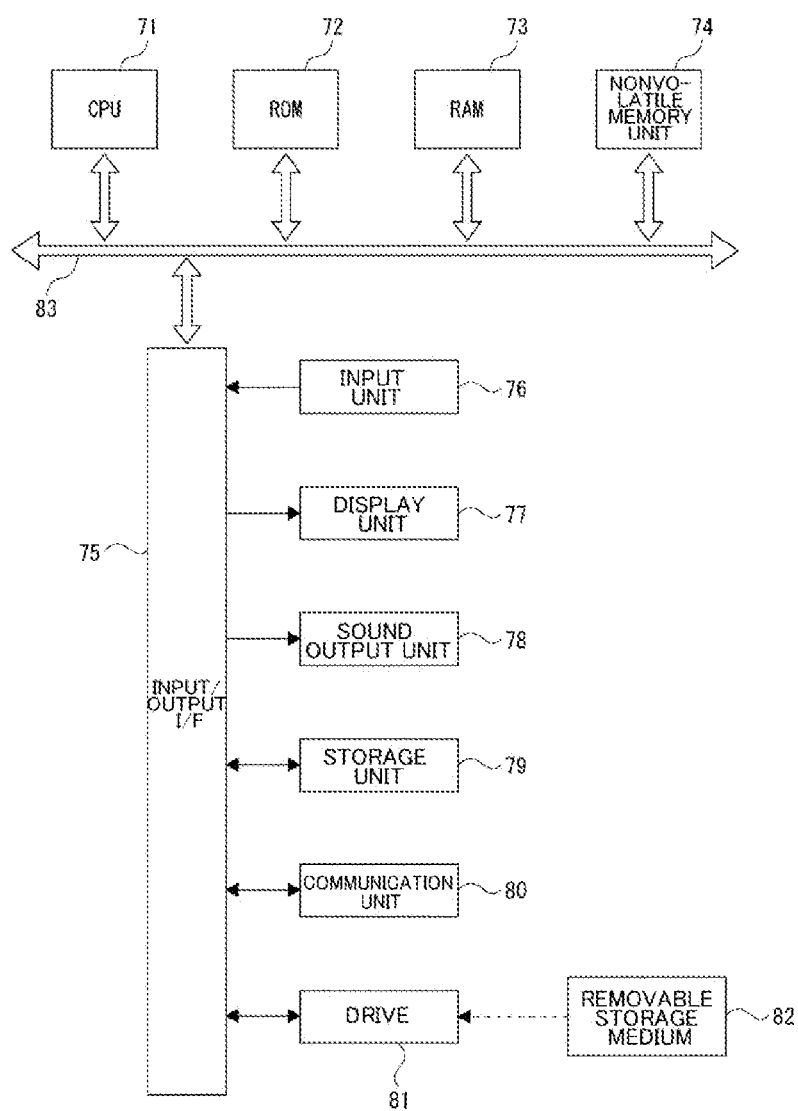
FIG. 3 is a function block diagram illustrating an information processing device.

In other words, the wide-angle camera 2, the telephoto camera 3, and the like described above are configured as information processing devices in order to provide the functions described above. FIG. 3 is a function block diagram of the information processing device.

Each information processing device does not need to include all the components described below and may include only some thereof.

As illustrated in FIG. 3, a CPU (Central Processing Unit) 71 of each information processing device executes various types of processing according to programs stored in a ROM (Read Only Memory) 72 or a nonvolatile memory unit 74 such as an EEP-ROM (Electrically Erasable Programmable Read-Only Memory), for example, or programs loaded from a storage unit 79 into a RAM (Random Access Memory) 73. The RAM 73 appropriately stores not only data used for the CPU 71 to perform various types of processing, but also necessary data or the like.

The CPU 71, the ROM 72, the RAM 73, and the non-volatile memory unit 74 are connected by a bus 83. An input/output interface 75 is also connected to the bus 83.

An input unit 76 constituted by an operator or an operation device is connected to the input/output interface 75.

For example, various operators or operation devices such as a keyboard, a mouse, keys, a dial, a touch panel, a touch pad, and a remote controller are conceivable as the input unit 76.

A user operation is detected by the input unit 76, and a signal corresponding to the input operation is interpreted by the CPU 71.

Further, a display unit 77 constituted by an LCD (Liquid Crystal Display), an organic EL panel, or the like, and a sound output unit 78 constituted by a speaker or the like, are connected to the input/output interface 75 as one entity or separate entities.

The display unit 77 is a display unit that performs various types of displays, and is constituted by, for example, a display device provided in the housing of the wide-angle camera 2, the telephoto camera 3, or the like serving as the information processing device, or, for example, a separate display device connected to the housing. In the case of the wide-angle camera 2, the telephoto camera 3, and the like according to the present embodiment, a rear surface monitor or the like corresponds to the display unit 77.

The display unit 77 executes the display of images for various types of image processing, moving images to be processed, and the like in the display screen based on instructions from the CPU 71. The display unit 77 displays various operation menus, icons, and messages, i.e., a GUI (Graphical User Interface), in response to instructions from the CPU 71.

The storage unit 79 constituted by a hard disk, a solid-state memory, or the like, a communication unit 80 constituted by a modem or the like, and so on may be connected to the input/output interface 75.

The communication unit 80 performs communication processing over a transmission path such as the Internet, communication such as wired/wireless communication or bus communication with various types of devices, and the like.

A drive 81 is also connected to the input/output interface 75 as necessary, and a removable storage medium 82 such as a magnetic disk, an optical disc, a magneto-optical disc, or a semiconductor memory is mounted in the drive 81 as appropriate.

The drive 81 can be used to read data files such as image files, various computer programs, or the like from the removable storage medium 82. The read data files are stored in the storage unit 79, images or sounds included in the data file are output to the display unit 77 or the sound output unit 78, and the like. The computer programs or the like read from the removable storage medium 82 are installed in the storage unit 79 as necessary.

In the information processing device, for example, software for processing in the present embodiment can be installed through network communication using the communication unit 80 or through the removable storage medium 82.

Alternatively, the software may be stored in advance in the ROM 72, the storage unit 79, or the like.

By performing processing operations based on various types of programs, the CPU 71 executes required information processing, communication processing, and the like, which will be described later, in the first processing unit 5 of the wide-angle camera 2, the second processing unit 7 of the telephoto camera 3, and the like.

Note that the information processing device that constitutes the wide-angle camera 2, the telephoto camera 3, or the like is not limited to the single configuration of the information processing device illustrated in FIG. 3, and a plurality of information processing devices may be configured as a system. The plurality of information processing devices may be configured as a system using a LAN or the like, or may be installed in a remote location through a VPN or the like using the Internet or the like. The plurality of information processing devices may include an information processing device as a group of servers (the cloud) that can be used by a cloud computing service.

3. Functional Configuration of Each Processing Unit

The first processing unit 5 provided with the wide-angle camera 2 and the second processing unit 7 provided with the telephoto camera 3 include various units for performing various types of processing. Examples will be described in detail with reference to FIG. 4.

The first processing unit 5 includes a tracking target object determination unit 9, a tracked object information obtainment unit 10, a conversion processing unit 11, a tracked object identification unit 12, a determination processing unit 13, a movement direction estimation unit 14, a tracking change processing unit 15, and a communication processing unit 16.

The tracking target object determination unit 9 performs processing for determining an object to be tracked based on the captured image captured by the first image capturing unit 4. In the following descriptions, the image captured by the first image capturing unit 4 will be referred to as a "first image GC1", and the object to be tracked determined based on the first image GC1 will be referred to as a "tracking target object T1".

Various methods for determining the tracking target object T1 are conceivable. For example, for a soccer game, as illustrated in FIG. 1, the player controlling the ball may be determined to be the tracking target object T1. In this case, for example, a candidate object is detected using the background difference method, and an object that matches the ball is identified therefrom. The player located closest to the object identified as the ball, the player touching the ball, or the like is then determined to be tracking target object T1.

Additionally, it is conceivable to determine a player who has just scored a goal as the tracking target object T1 for a set period of time. In this case, matching processing using features such as the face, the hairstyle, and the like of the player who scored the goal may be performed, and an object having a high score may be identified as the player and determined to be the tracking target object T1. The player may instead be identified by performing matching processing or the like using the number written on the player's uniform.

Furthermore, zoomed-in images may be captured of all players by determining each player to be the tracking target object T1 for a set period of time. This is suitable for player introductions before the start of games, for example.

In this manner, the tracking target object determination unit 9 performs processing for determining the tracking target object T1 from each object, such as each player, ball, referee, or the like.

The tracked object information obtainment unit 10 performs processing for obtaining information for identifying the object being tracked by the second image capturing unit 6 of the telephoto camera 3. In the following descriptions, the object being tracked by the second image capturing unit 6 will be referred to as a "tracked object T2". Additionally, an image captured by the second image capturing unit 6 will be referred to as a "second image GC2".

Various types of information for identifying the tracked object T2 are conceivable. In the present embodiment, information indicating the optical axis direction of the second image capturing unit 6 is obtained as information for identifying the tracked object T2.

Accordingly, in the present embodiment, the wide-angle camera 2 and the telephoto camera 3 are installed such that a distance between the first image capturing unit 4 and the second image capturing unit 6 is smaller than the distances between the respective image capturing units and the object. For example, the distances between the image capturing units and the object are several tens of meters, and the distance between the first image capturing unit 4 and the second image capturing unit 6 are several tens of centimeters.

If the optical axis direction of the second image capturing unit 6 is known, it is possible to automatically identify an object captured within the angle of view of the second image capturing unit 6, i.e., the tracked object T2. Processing of identifying the tracked object T2 is processing executed by the tracked object identification unit 12, which will be described later.

If the positional relationship between the wide-angle camera 2 and the telephoto camera 3 can be found, the wide-angle camera 2 and the telephoto camera 3 do not absolutely have to be installed such that the distance between the first image capturing unit 4 and the second image capturing unit 6 is smaller than the distances between the respective image capturing units and the object.

The conversion processing unit 11 converts coordinates (a position) of the object in the first image GC1 captured by the wide-angle camera 2 and information representing the optical axis direction of the second image capturing unit 6 of the telephoto camera 3 (e.g., a control amount in the pan direction and a control amount in the tilt direction).

For example, the coordinates of the tracking target object T1 in the first image GC1 are converted into information representing the optical axis direction of the second image capturing unit 6. The first processing unit 5 of the wide-angle camera 2 transmits the converted information to the telephoto camera 3, which makes it possible for the telephoto camera 3 to capture a close-up of the tracking target object T1.

The conversion processing unit 11 also converts information representing the optical axis direction of the second image capturing unit 6, received from the telephoto camera 3, into coordinates in the first image GC1. Through this, the first processing unit 5 of the wide-angle camera 2 can identify the tracked object T2 in the second image capturing unit 6 of the telephoto camera 3.

The tracked object identification unit 12 identifies the object being tracked by the second image capturing unit 6 from among the objects appearing in the first image GC1, based on the coordinates in the first image GC1 converted by the conversion processing unit 11.

Figure 5:
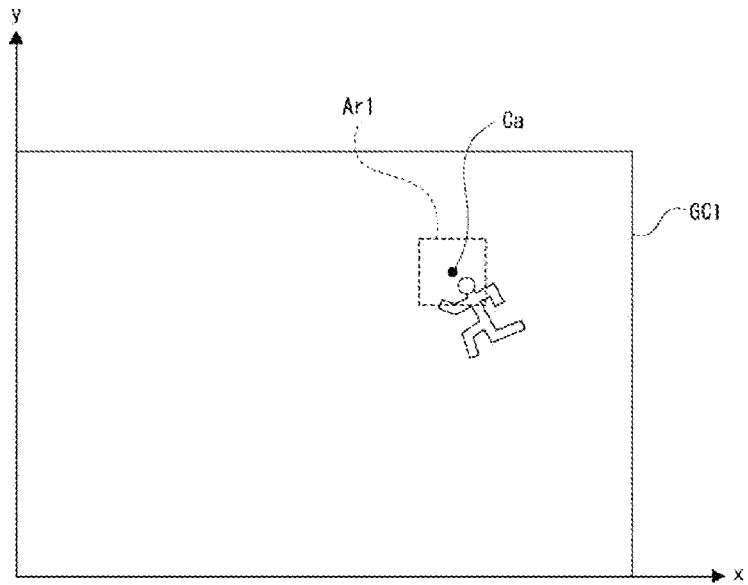
FIG. 5 is a diagram illustrating the identification of a tracked object based on post-conversion coordinates and a predetermined area.

For example, as illustrated in FIG. 5, assume the coordinates in the horizontal direction in the first image GC1 are represented by x, the coordinates in the vertical direction are represented by y, and the coordinates in the first image GC1 converted by the conversion processing unit 11 are "post-conversion coordinates Ca". The tracked object identification unit 12 identifies an object of which at least a part is located in a predetermined range centered on the post-conversion coordinates Ca, e.g., a predetermined area Ar1, based on angle of view information of the second image capturing unit 6, as the tracked object T2.

The determination processing unit 13 determines whether the tracked object T2 identified by the tracked object identification unit 12 and the tracking target object T1 determined by the tracking target object determination unit 9 are the same object.

Figure 6:
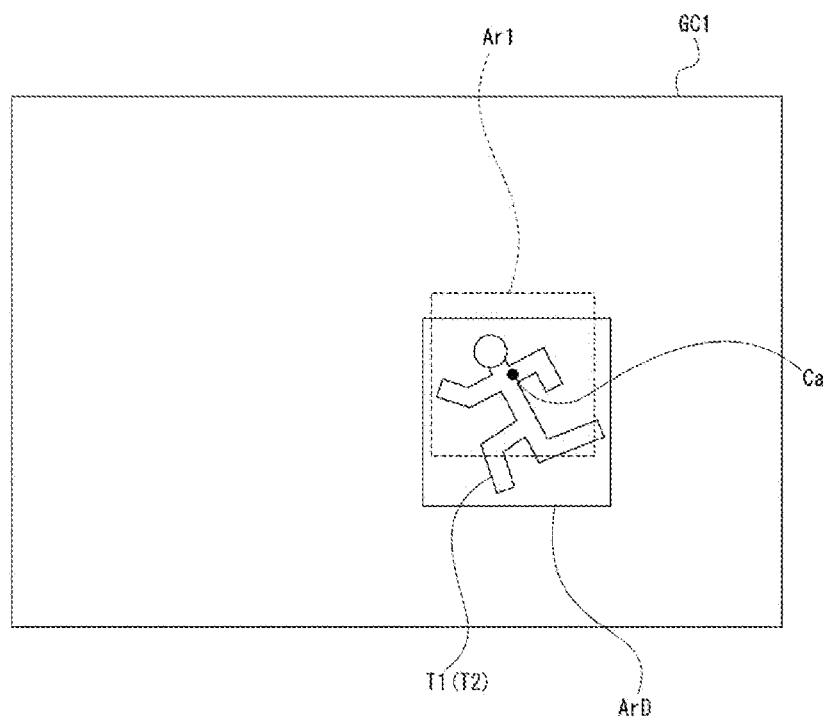
FIG. 6 is a diagram illustrating a state in which a tracking target object and a tracked object match.

Several examples of the details of processing performed by the tracked object identification unit 12 and the determination processing unit 13 will be given. One example will be given first with reference to FIG. 6. When the area where the tracking target object T1 is captured in the first image GC1 is taken as a "target area ArD", the predetermined area Ar1 based on the post-conversion coordinates Ca is positioned such that the area partially overlaps with the target area ArD. Furthermore, the tracking target object T1 is partially located within the predetermined area Ar1. In such a case, the tracked object identification unit 12 identifies the object located within the predetermined area Ar1 as the tracked object T2. Accordingly, the determination processing unit 13 determines that the tracking target object T1 and the tracked object T2 are the same object.

Figure 7:
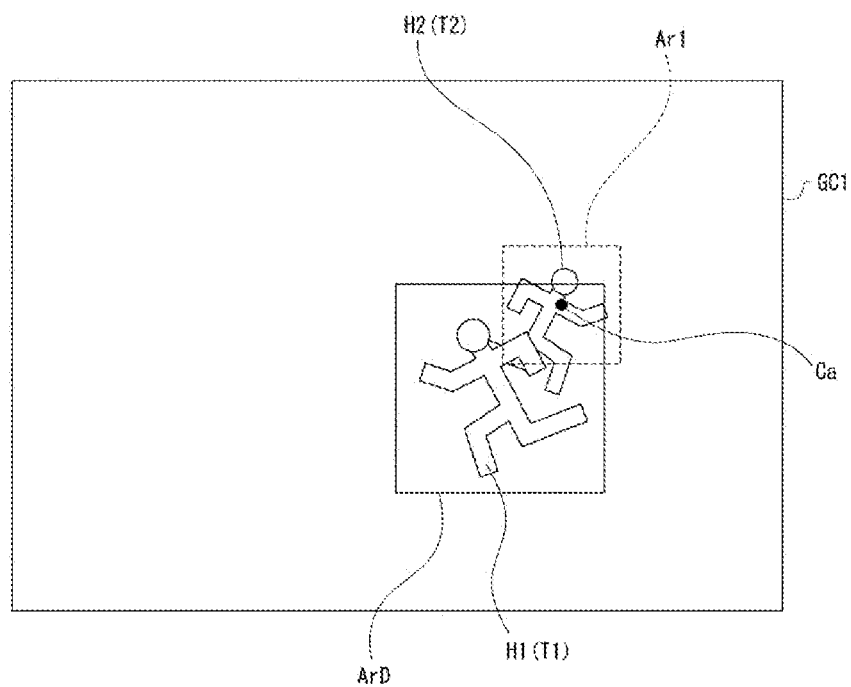
FIG. 7 is a diagram illustrating a state in which a tracking target object and a tracked object do not match.

Another example will be given with reference to FIG. 7. The predetermined area Ar1 based on the post-conversion coordinates Ca is positioned so as to partially overlap with the target area ArD, which is the area where the tracking target object T1 is captured in the first image GC1. The predetermined area Ar1 includes a part of an object H1 captured as an object located at closer range, and a part of an object H2 captured as an object located farther away. The object H1 is the tracking target object T1. From this, it can be said that a part of the tracking target object T1 is located within the angle of view of the second image capturing unit 6.

However, the object H2 is located closer to the center of the angle of view of the second image capturing unit 6 than the object H1. In this case, the tracked object identification unit 12 identifies the object H2 as the tracked object T2. The determination processing unit 13 therefore determines that the tracking target object T1 and the tracked object T2 are not the same object in the situation illustrated in FIG. 7.

Note that in order to make this determination more reliably, the tracked object identification unit 12 may take into account the movement direction of the predetermined area Ar1. In the example illustrated in FIG. 7, the object H1 is an object moving from right to left within the angle of view of the first image capturing unit 4. The object H2 is an object moving from left to right within the angle of view of the first image capturing unit 4.

Accordingly, the movement direction of the predetermined area Ar1 may be identified based on a history of coordinates of the predetermined area Ar1 in the past, and the object H1 may be identified as the tracked object T2 if the predetermined area Ar1 is moving from right to left, whereas the object H2 may be identified as the tracked object T2 if the predetermined area Ar1 is moving from left to right. In other words, an object moving in the same direction as the movement direction of the predetermined area Ar1 is identified as the tracked object T2.

Note that such processing may be performed when a plurality of objects are located in the predetermined area Ar1. When there is only one object (person) located in the predetermined area Ar1, that object may be identified as the tracked object T2.

There is a slight time lag between the timing at which the second processing unit 7 obtains the information about the optical axis direction of the second image capturing unit 6 and the timing at which the tracked object T2 is identified by the first processing unit 5 based on that information after the information is transmitted to the first processing unit 5 of the wide-angle camera 2. Due to this time lag, there is a risk that an object different from the object that had been being tracked by the second image capturing unit 6 will be identified as the tracked object T2.

To prevent this, the tracked object identification unit 12 may obtain the first image GC1 captured at a time close to the capture time at which the second image GC2, which is object to the processing in which the second processing unit 7 obtains the information on the optical axis direction of the second image capturing unit 6, was captured, and execute the processing for identifying the tracked object T2 as described above using the first image GC1.

For example, selecting the first image GC1 captured at the time closest to the capture time at which the second image GC2 was captured makes it possible to increase the likelihood of correctly identifying the tracked object T2.

The movement direction estimation unit 14 and the tracking change processing unit 15 execute various types of processing when the determination processing unit 13 determines that the tracking target object T1 and the tracked object T2 are not the same object.

Specifically, the movement direction estimation unit 14 performs processing for estimating the movement direction of the tracking target object T1. For example, the newest frame to a past frame of the first image GC1 captured by the first image capturing unit 4 are stored and the movement direction of the tracking target object T1 is estimated. This processing identifies the coordinates of the tracking target object T1 in each frame by performing matching processing on the tracking target object T1 in each frame, and estimates the movement direction of the tracking target object T1 from a change in those coordinates.

Additionally, the movement direction estimation unit 14 may estimate the movement speed as well as the movement direction of the tracking target object T1.

Note that the first processing unit 5 may be configured without including the movement direction estimation unit 14.

The tracking change processing unit 15 performs processing for causing the object to be tracked by the second image capturing unit 6, i.e., the tracked object T2, to change.

For example, by transmitting the information representing the optical axis direction of the second image capturing unit 6, which has been converted from the coordinate information of the tracking target object T1 through the above-described processing performed by the conversion processing unit 11, to the telephoto camera 3, the second processing unit 7 of the telephoto camera 3 is caused to execute processing for changing the tracked object T2 tracked by the second image capturing unit 6 to the same object as the tracking target object T1.

Such processing by the movement direction estimation unit 14 and the tracking change processing unit 15 may be performed, for example, every time information for identifying the tracked object T2 is obtained from the telephoto camera 3. In other words, as long as information for identifying the tracked object T2 is obtained from the telephoto camera 3, and a situation in which the tracked object T2 is an object different from the tracking target object T1 continues, the processing is executed each time the information is obtained from the telephoto camera 3.

Note that the determination processing unit 13 determining that the tracking target object T1 and the tracked object T2 are the same object indicates that the tracking of the object by the second image capturing unit 6 is being performed as intended. In this case, there are a number of conceivable processes executed by the movement direction estimation unit 14 and the tracking change processing unit 15.

For example, only processing for transmitting information representing the optical axis direction of the second image capturing unit 6 for tracking the tracking target object T1 by the tracking change processing unit 15 may be executed, without performing processing for calculating information about the movement direction and movement speed of the tracking target object T1 by the movement direction estimation unit 14.

Alternatively, the frequency of the transmission processing performed by the tracking change processing unit 15 may be reduced. For example, although the foregoing describes an example in which the tracking change processing unit 15 executes the transmission processing each time the information for identifying the tracked object T2 is obtained from the telephoto camera 3, the tracking change processing unit 15 may refrain from performing the transmission processing until the information for identifying the tracked object T2 is obtained from the telephoto camera 3 a predetermined number of times. Through this, the processing load on the first processing unit 5 is reduced.

Additionally, the tracking change processing unit 15 need not perform the information transmission processing as long as a situation in which the tracking target object T1 and the tracked object T2 are determined to be the same object continues. In this case, the second processing unit 7 of the telephoto camera 3 can recognize that the correct object can be tracked while the information representing the optical axis direction of the second image capturing unit 6 is not being received from the wide-angle camera 2, and can also recognize that the object being tracked is incorrect when that information is received from the wide-angle camera 2.

The communication processing unit 16 performs wired or wireless communication with the telephoto camera 3 in accordance with the processing by the above-described units. These communication processes are implemented using the communication unit 80 of FIG. 3 provided in the wide-angle camera 2.

Figure 4:
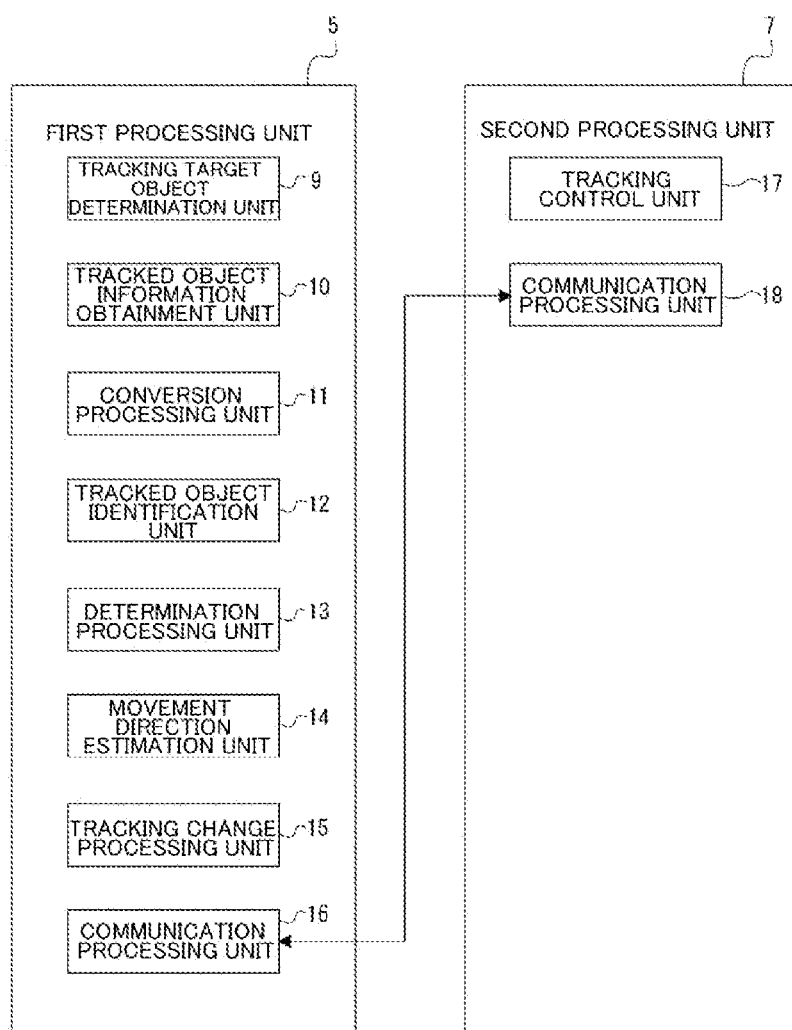
FIG. 4 is a function block diagram illustrating a first processing unit and a second processing unit.

The second processing unit 7 includes a tracking control unit 17 and a communication processing unit 18 (see FIG. 4).

The tracking control unit 17 performs various types of processing for the second image capturing unit 6 to properly track the object.

Specifically, the tracking control unit 17 performs processing for continuing the tracking of the tracked object T2 based on the image captured by the second image capturing unit 6. Note that the image captured by the second image capturing unit 6 is the second image GC2, as described earlier.

The processing for continuing the tracking can be implemented by processing that is closed inside the telephoto camera 3, without receiving information from the wide-angle camera 2. This tracking processing will be referred to as "local tracking processing".

In the local tracking processing, the tracking control unit 17 performs matching processing on the tracked object T2 each time the second image GC2 captured by the second image capturing unit 6 of the telephoto camera 3 is obtained. In accordance with the coordinates of the tracked object T2 in the second image GC2 newly identified through the matching processing, a driving instruction is sent to the PTZ control unit 8 such that the tracked object T2 is located in the center of the angle of view of the second image capturing unit 6. The PTZ control unit 8 changes the composition such that the tracked object T2 is located near the center of the angle of view of the second image capturing unit 6 by controlling the platform in accordance with the instruction.

Note that the PTZ control unit 8 may perform zoom control so as not to cause the tracked object T2 to become too large or too small with respect to the angle of view of the second image capturing unit 6.

In addition to the local tracking processing, the tracking control unit 17 can also execute processing for starting to track the newly-set tracking target object T1. For example, when the tracked object T2 tracked by the second image capturing unit 6 is different from the tracking target object T1, information pertaining to the optical axis direction of the second image capturing unit 6 is transmitted as information for tracking the tracking target object T1 from the wide-angle camera 2.

The tracking control unit 17 changes the optical axis direction of the second image capturing unit 6 by issuing driving instructions to the PTZ control unit 8 in response to the information pertaining to the received optical axis direction, so as to capture the tracking target object T1 in the angle of view of the second image capturing unit 6.

Note that there is a risk that the tracking target object T1 has moved during the processing of calculating the information about the optical axis direction of the second image capturing unit 6 of the telephoto camera 3 from the coordinate information of the tracking target object T1 in the wide-angle camera 2, the processing for transmitting that information to the telephoto camera 3, and the processing for the telephoto camera 3 to receive the information, and that the tracking of the new tracking target object T1 cannot be started normally.

To handle this, the wide-angle camera 2 may include the movement direction estimation unit 14. The movement direction estimation unit 14 calculates the movement direction and the movement speed for the tracking target object T1 as described above. The tracking control unit 17 of the telephoto camera 3 receives the information of the movement direction and the movement speed for the tracking target object T1, and performs processing for predicting the movement destination of the tracking target object T1 based on that information. At this time, the predicted position (predicted coordinates) of the tracking target object T1 may be calculated in the wide-angle camera 2, taking into account the time difference between the capture time of the first image GC1 used to calculate the coordinate information of the tracking target object T1 and the current time. By performing control such that the tracking target object T1 is captured within the angle of view of the second image capturing unit 6 in accordance with the predicted position, the tracking control unit 17 can perform tracking processing for the correct object.

In this manner, the tracking control unit 17 can execute processing for starting local tracking control by adjusting the optical axis direction of the second image capturing unit 6 such that the newly-set tracking target object T1 is captured within the angle of view (first processing), processing for continuing the local tracking processing for the tracked object T2 currently being tracked (second processing), and the like.

The tracking control unit 17 switches between the first processing and the second processing according to the situation.

For example, when information pertaining to the optical axis direction of the second image capturing unit 6 and information pertaining to the movement direction and the movement speed of the tracking target object T1 have been obtained from the wide-angle camera 2, the first processing is performed assuming that the tracked object T2 is the incorrect object.

On the other hand, when this information is not received from the wide-angle camera 2, the second processing is executed assuming that the tracked object T2 tracked by the second image capturing unit 6 is the correct object.

In this manner, the tracking control unit 17 performs second processing that causes the local tracking processing to continue when the tracked object T2 is an appropriate object. Note that the second processing has a relatively lighter processing load than the first processing, and thus the processing load on the second processing unit 7 can be prevented from increasing by performing the second processing when the tracked object T2 is the correct object.

Note that the configuration may be such that as long as a situation in which the tracking target object T1 and the tracked object T2 are determined to be the same object continues, only information pertaining to the optical axis direction of the second image capturing unit 6 is received from the wide-angle camera 2, without including information pertaining to the movement direction and the movement speed of the tracking target object T1. In this case, the configuration may be such that when the tracking target object T1 and the tracked object T2 are determined not to be the same object, all of the information pertaining to the movement direction and the movement speed of the tracking target object T1 and the optical axis direction of the second image capturing unit 6 is received from the wide-angle camera 2.

In this case, the information pertaining to the optical axis direction of the second image capturing unit 6 is received from the wide-angle camera 2 even the tracking target object T1 and the tracked object T2 are determined to be the same object, and thus the communication environment can be confirmed to be normal.

The tracking control unit 17 transmits the information for identifying the tracked object T2 to the wide-angle camera 2 via the communication processing unit 18 by outputting that information to the communication processing unit 18. For example, the control amount in the pan direction, the control amount in the tilt direction, and the like are output as the information for identifying the optical axis direction of the second image capturing unit 6 at the present time. At this time, the capture time may be output to the communication processing unit 18 such that the above-described time lag can be taken into account when the tracked object identification unit 12 identifies the tracked object T2.

The communication processing unit 18 performs wired or wireless communication with the wide-angle camera 2 in accordance with the processing by the above-described tracking control unit 17. These communication processes are implemented using the communication unit 80 of FIG. 3 provided in the telephoto camera 3.

Specifically, the communication processing unit 18 performs processing for receiving information transmitted from the communication processing unit 16 of the wide-angle camera 2. For example, information on the control amount in the pan direction, information on the control amount in the tilt direction, and the like is received as information for adjusting the optical axis direction of the second image capturing unit 6. Additionally, the communication processing unit 18 may receive, as the information for adjusting the optical axis direction, information about the movement direction, the movement speed, and the like of the tracking target object T1.

The communication processing unit 18 performs processing for transmitting information pertaining to the optical axis direction of the second image capturing unit 6 (e.g., information on the control amount in the pan direction, the control amount in the tilt direction, and the like) to the communication processing unit 16 of the wide-angle camera 2, as the information for identifying the tracked object T2.

The communication processing unit 18 may transmit information pertaining to the optical axis direction of the second image capturing unit 6 each time the second image GC2 is obtained (each frame) such that the wide-angle camera 2 can promptly detect that the object being tracked is in an incorrect state in the second image capturing unit 6.

4. Flowcharts

A flowchart illustrating processing executed by the first processing unit 5 of the wide-angle camera 2 and processing executed by the second processing unit 7 of the telephoto camera 3 will be described here.

4-1. Flowchart of Processing Executed by First Processing Unit

Figure 8:
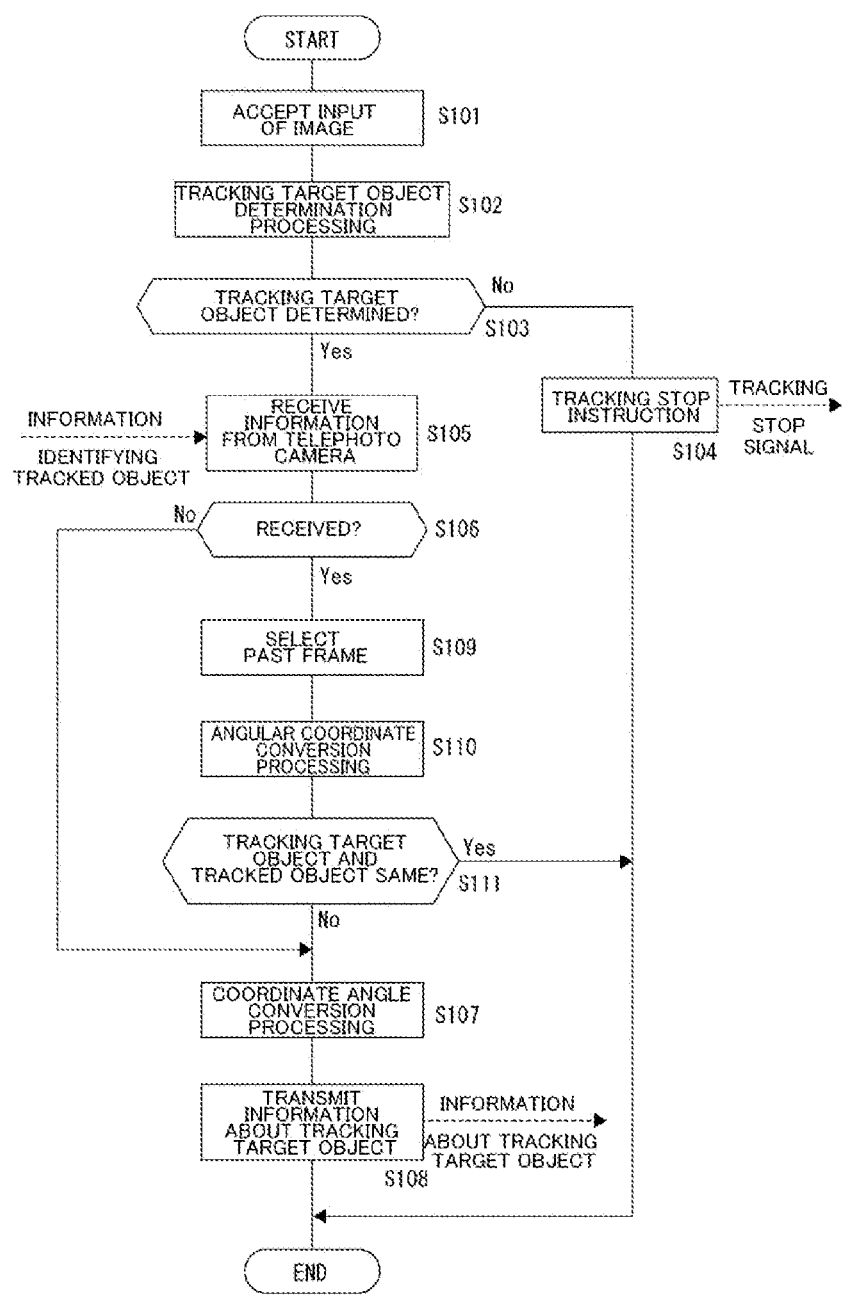
FIG. 8 is a flowchart illustrating an example of processing executed by the first processing unit.

FIG. 8 illustrates an example of the flowchart of the processing executed by the first processing unit 5. Note that the series of processing illustrated in FIG. 8 is processing executed each time the information on the first image GC1 is input. For example, when the first image capturing unit 4 is capturing images at 30 fps, the series of processing illustrated in FIG. 8 is repeatedly executed 30 times per second.

Note that the series of processing illustrated in FIG. 8 may instead be executed once every several times the information on the first image GC1 is input.

In step S101, the first processing unit 5 accepts the input of the first image GC1. The first image GC1 is output from the first image capturing unit 4.

After accepting the input of the first image GC1, in step S102, the first processing unit 5 performs processing for determining the tracking target object T1. The processing is executed, for example, by the tracking target object determination unit 9 of the first processing unit 5.

In step S103, the first processing unit 5 performs a branching process for determining whether the tracking target object T1 has been determined. For example, when, as a result of using the background difference method or the like, no objects other than the background are present, there may be cases where the tracking target object T1 is not determined. In such a case, it is determined that the tracking target object T1 has not been determined, and in step S104, the first processing unit 5 transmits a tracking stop instruction to the telephoto camera 3. Through this, the tracking control performed by the second image capturing unit 6 of the telephoto camera 3 is stopped. Note that if the tracking control has not been started, the tracking control remains in a stopped state.

On the other hand, if it is determined that the tracking target object T1 has been determined, in step S105, the first processing unit 5 receives information from the telephoto camera 3. The information received here is the information for identifying the tracked object T2, and is information about the optical axis direction of the second image capturing unit 6, for example.

Next, in step S106, the first processing unit 5 performs processing for determining whether information has been received from the telephoto camera 3. In the initial state, the second image capturing unit 6 of the telephoto camera 3 has not started the tracking processing for the object, and the telephoto camera 3 has not transmitted the information pertaining to the optical axis direction of the second image capturing unit 6 or the like to the wide-angle camera 2. Accordingly, the determination result of step S106 in the initial state is "No".

In that case, in step S107, the first processing unit 5 performs coordinate angle conversion processing. The coordinate angle conversion processing is processing executed by the conversion processing unit 11, and specifically is processing for converting coordinates in the first image GC1 of the tracking target object T1 into information representing the optical axis direction of the second image capturing unit 6. The information representing the optical axis direction of the second image capturing unit 6 can also be referred to as information pertaining to the image capture angle of the second image capturing unit 6.

Next, in step S108, the first processing unit 5 performs processing for transmitting information about the tracking target object T1. In this processing, for example, information on the control amount in the pan direction, information on the control amount in the tilt direction, and the like for bringing the tracking target object T1 into the angle of view of the second image capturing unit 6 is transmitted to the telephoto camera 3.

Through this, the tracking control for the tracking target object T1 is started by the second image capturing unit 6 of the telephoto camera 3.

When the tracking processing by the second image capturing unit 6 of the telephoto camera 3 is started, the information for identifying the tracked object T2 is transmitted from the telephoto camera 3 at a predetermined timing, such as when the second image GC2 is captured.

When the information for identifying the tracked object T2 has been received from the telephoto camera 3, the first processing unit 5 makes a determination of "Yes" in step S106, and the sequence then moves to step S109.

In step S109, the first processing unit 5 selects the first image GC1 in a past frame. This processing is processing for the first processing unit 5 to properly identify the tracked object T2, and is processing for selecting the first image GC1 captured at the timing when the telephoto camera 3 generates the information for identifying the tracked object T2.

In step S110, the first processing unit 5 performs angular coordinate conversion processing. This processing is processing executed by the conversion processing unit 11, and is specifically processing for converting information representing the optical axis direction of the second image capturing unit 6 received as the information for identifying the tracked object T2 into coordinates of the tracked object T2 in the first image GC1 selected in step S109.

Through this, the first processing unit 5 can identify the coordinates of the tracking target object T1 and the coordinates of the tracked object T2 in the first image GC1 that was selected.

In step S111, the first processing unit 5 performs branching processing for determining whether the tracking target object T1 and the tracked object T2 are the same object.

If the objects are determined to be the same, the first processing unit 5 ends the series of processing illustrated in FIG. 8. On the other hand, if it is determined that the objects are not the same, the first processing unit 5 converts the coordinates of the tracking target object T1 into the information representing the optical axis direction of the second image capturing unit 6 by performing the processing of step S107, and transmits the coordinates to the telephoto camera 3 in step S108.

4-2. Flowchart of Processing Executed by Second Processing Unit

Figure 9:
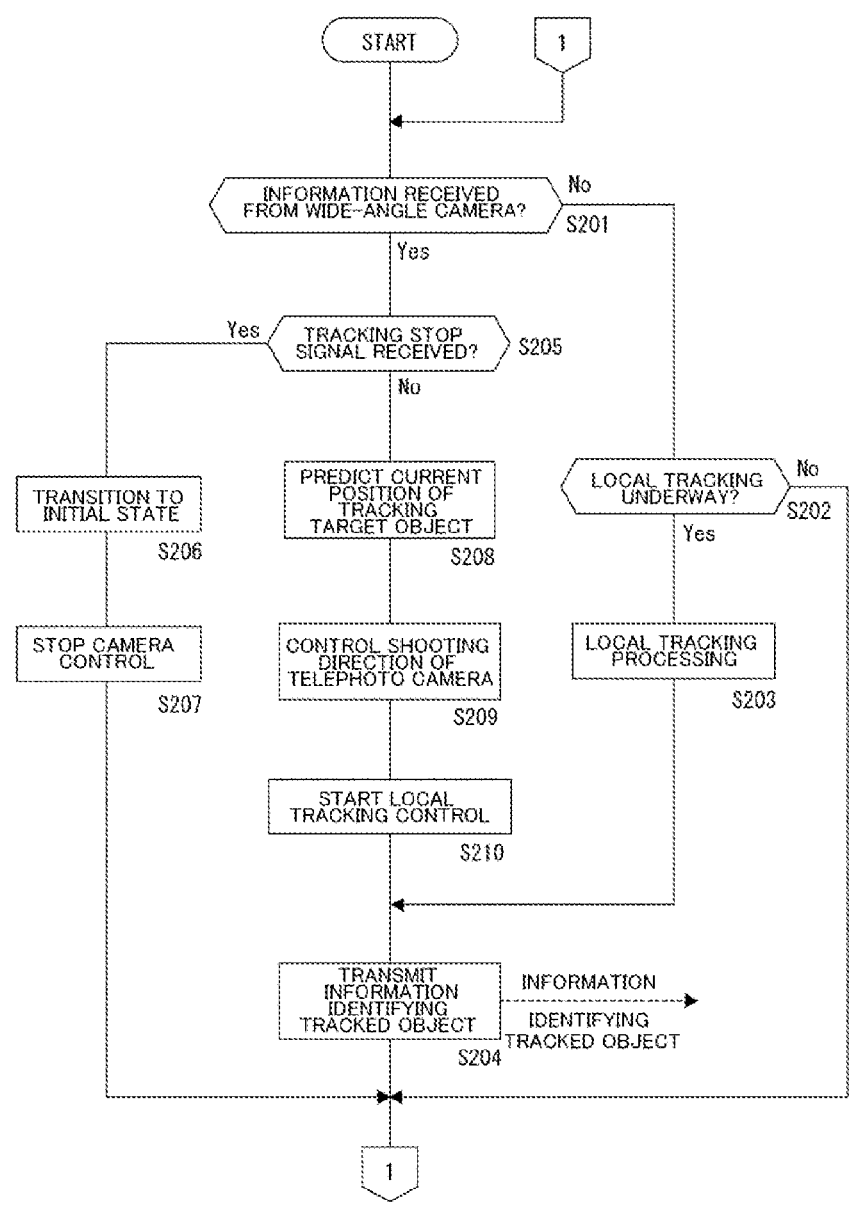
FIG. 9 is a flowchart illustrating an example of processing executed by the second processing unit.

FIG. 9 illustrates an example of the flowchart of the processing executed by the second processing unit 7. The second processing unit 7 repeatedly executes the series of processing illustrated in FIG. 9 until a predetermined condition is met, such as the telephoto camera 3 being turned off.

In step S201, the second processing unit 7 determines whether information has been received from the wide-angle camera 2. This information is the information transmitted from the wide-angle camera 2 through the transmission processing of step S108 in FIG. 8 described earlier, and is information about the tracking target object T1. This is, for example, the information pertaining to the optical axis direction of the second image capturing unit 6. Alternatively, a stop signal for stopping the tracking processing may be transmitted from the wide-angle camera 2. The second processing unit 7 determines whether to receive this information, too, in step S201.

If it is determined in step S201 that the information has not been received, in step S202, the second processing unit 7 performs branching processing to determine whether the local tracking processing is being executed.

If the local tracking processing is not being executed, the second processing unit 7 returns to the processing of step S201. In other words, the processing of step S202 when the local tracking processing is not being executed is processing for standing by until the information about the tracking target object T1 is obtained from the wide-angle camera 2.

If it is determined that the local tracking processing is being executed, the second processing unit 7 performs local tracking processing in step S203. In this processing, the second processing unit 7 obtains the second image GC2 as the newest frame captured by the second image capturing unit 6, and identifies the coordinates of the tracked object T2 in the newest frame by performing matching processing using the capturing area of the tracked object T2 in the second image GC2 as a past frame obtained one frame previous. Furthermore, the second processing unit 7 performs the local tracking processing by sending instructions to the PTZ control unit 8 such that the new coordinates are located at the center of the angle of view.

Next, in step S204, the second processing unit 7 transmits, to the wide-angle camera 2, information regarding, for example, the optical axis direction of the second image capturing unit 6, as the information for identifying the tracked object T2. The second processing unit 7 returns to the processing of step S201 after executing step S204.

In other words, as long as a state in which the local tracking is performed without receiving the information from the wide-angle camera 2 continues, the second processing unit 7 performs the local tracking processing in step S203, and repeats the transmission of the information for identifying the tracked object T2 in step S204.

If it has been determined that information about the tracking target object T1 has been received from the wide-angle camera 2, in step S205, the second processing unit 7 determines whether a tracking stop signal has been received.

The tracking stop signal is, for example, information received from the wide-angle camera 2 when the game to be captured in the image capturing system 1 has ended and the object to be captured no longer exists, when a predetermined length of time (the game time) has passed, when an operation to stop the image capturing system 1 has been made by an operator, or the like. Note that this information may be input directly into the telephoto camera 3 without going through the wide-angle camera 2.

If it is determined that the tracking stop signal has been received, in step S206, the second processing unit 7 performs processing for transitioning to the initial state. In the initial state, for example, an instruction is sent to the PTZ control unit 8 to bring the optical axis direction of the second image capturing unit 6 in the telephoto camera 3 to the direction facing a central part of a space to be captured. The central part of the space to be captured is, for example, a center circle or the like in the case of a soccer field. Through this, the control amounts in the pan direction and the tilt direction for the tracking target object T1 designated when the capturing is resumed to fall within the angle of view of the second image capturing unit 6 need not be increased, which makes it possible to start the tracking control promptly.

Note that processing such as for clearing the memory area in which the second image GC2, which was captured by the second image capturing unit 6 in step S206, is temporarily stored may be performed.

After transitioning to the initial state, the second processing unit 7 performs processing for stopping the camera control in step S207. The image capturing operations of the telephoto camera 3 are stopped as a result. The second processing unit 7 then returns to the processing of step S201.

In other words, after the camera control is stopped once, the confirmation processing of step S201 and step S202 is repeatedly executed until information about the tracking target object T1 is received from the wide-angle camera 2 again.

If the information received from the wide-angle camera 2 is not a tracking stop signal, or in other words, if information about the tracking target object T1 has been received from the wide-angle camera 2, in step S208, the second processing unit 7 performs processing for predicting the current position of the tracking target object T1. As described above, this processing is processing for predicting the movement destination of the tracking target object T1 based on the information on the movement direction and the movement speed of the tracking target object T1, received from the wide-angle camera 2.

Then, in step S209, the second processing unit 7 performs processing for adjusting the optical axis direction such that the tracking target object T1 is located within the angle of view of the second image capturing unit 6 of the telephoto camera 3. This processing is implemented by sending an instruction to the PTZ control unit 8.

The second processing unit 7 starts local tracking control in step S210.

After executing the processing of step S210, in step S204, the second processing unit 7 transmits the information for identifying the tracked object T2 to the wide-angle camera 2.

In this manner, after the local tracking control is started in step S210, the second processing unit 7 executes the confirmation processing in steps S201 and S202 until receiving information about the new tracking target object T1 from the wide-angle camera 2, and the local tracking processing in step S203 is executed, such that the tracking of the tracked object T2 continues.

5. Second Embodiment

The first embodiment described an example in which the information for identifying the tracked object T2 obtained by the tracked object information obtainment unit 10 of the first processing unit 5 is information representing the optical axis direction of the second image capturing unit 6.

Unlike the first embodiment, in the second embodiment, the tracked object information obtainment unit 10 obtains the second image GC2 captured by the second image capturing unit 6 as the information for identifying the tracked object T2.

The processing executed by the first processing unit 5 and the second processing unit 7 according to the second embodiment will be described.

Figure 10:
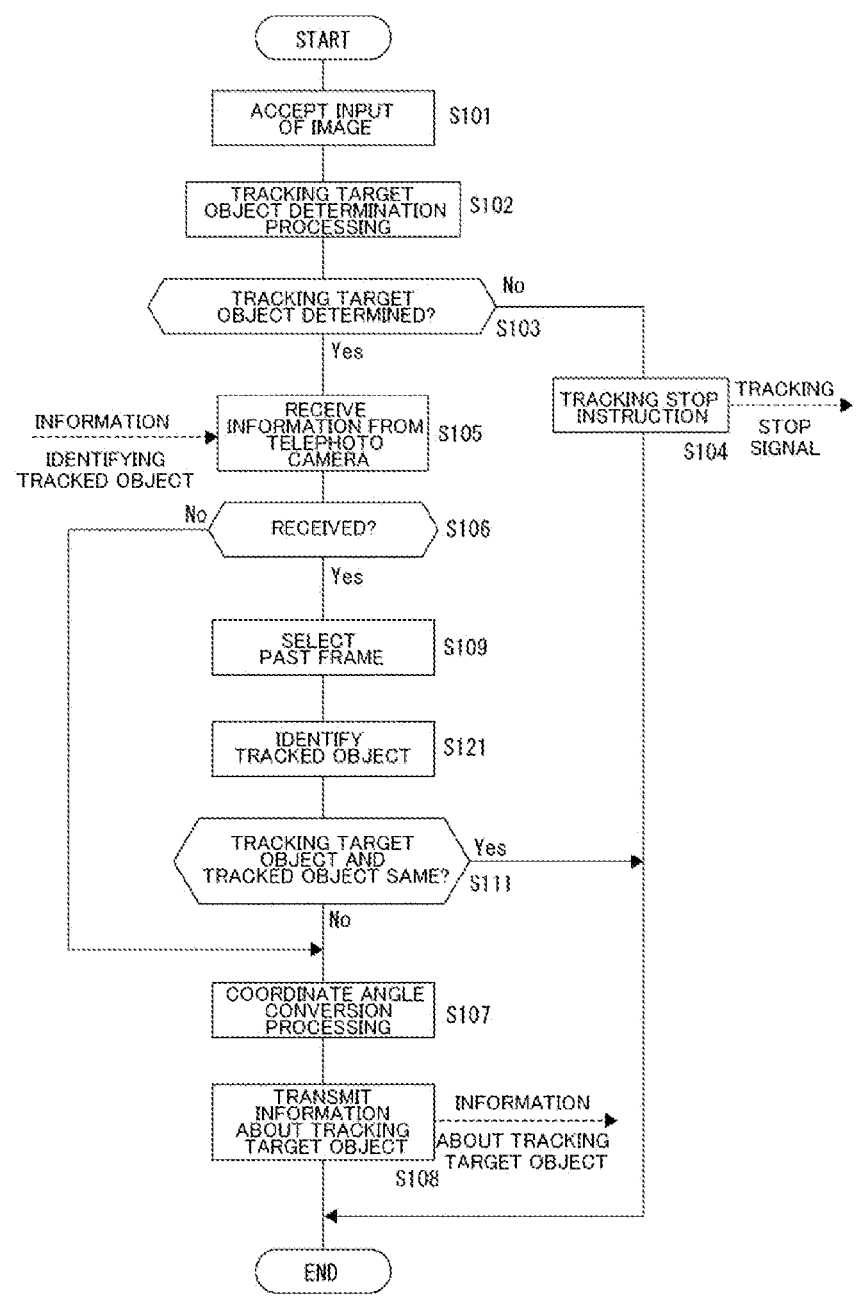
FIG. 10 is a flowchart illustrating an example of processing performed by the first processing unit according to a second embodiment.

FIG. 10 illustrates processing executed by the first processing unit 5. Note that processing that is the same as that illustrated in FIG. 5, executed by the first processing unit 5 according to the first embodiment, will be given the same reference signs, and descriptions thereof will be omitted as appropriate.

The first processing unit 5 executes the series of processing illustrated in FIG. 10 each time the first image GC1 is obtained. In other words, the first processing unit 5 accepts the input of an image (step S101), determines the tracking target object T1 (step S102), determines whether the tracking target object T1 has been determined (step S103), and then obtains information for identifying the tracked object T2 from the telephoto camera 3 (step S105). This information is the second image GC2 captured by the second image capturing unit 6.

In step S105, the first processing unit 5 obtains information such as the capture time, capture magnification, and the like of the second image GC2, along with the second image GC2.

If the second image GC2 can be confirmed as being received (step S106), the first processing unit 5 selects a past frame in step S109. The past frame selected at this time is a past frame captured at the time closest to the capture time of the second image GC2 received from the second processing unit 7 in step S105.

In step S121, the first processing unit 5 performs processing for identifying the tracked object T2. In the identification of the tracked object T2, the sizes of the object in the first image GC1 and the second image GC2 are unified by enlarging or reducing the second image GC2 using, for example, the information on the capture magnification when the second image GC2 was captured.

Then, by performing matching processing using the first image GC1 and the second image GC2, the image capturing position of the second image capturing unit 6 in the first image GC1 is identified.

Through this, the tracked object T2 being tracked by the second image capturing unit 6 can be identified.

The subsequent processing in steps S111, S107, and S108 is the same as the processing illustrated in FIG. 8, and will therefore not be described.

The second processing unit 7 executes the series of processing illustrated in FIG. 9. Note that for each process other than step S204, the processing is the same as in the first embodiment.

In step S204, the second processing unit 7 transmits the second image GC2 captured by the second image capturing unit 6 to the first processing unit 5 as the information for identifying the tracked object T2.

Through this, the first processing unit 5 can implement the above-described matching processing.

6. Third Embodiment

A third embodiment will describe an example of switching between a mode in which the second processing unit 7 tracks the tracking target object T1 in accordance with the results of the processing by the first processing unit 5 (a first mode) and a mode in which the second processing unit 7 continues tracking the tracked object T2 based on the second image GC2, regardless of the results of the processing by the first processing unit 5 (a second mode).

Figure 11:
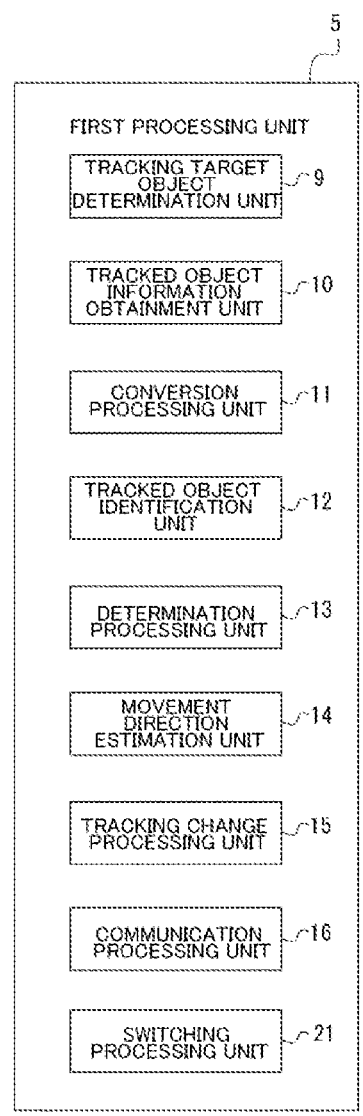
FIG. 11 is a function block diagram illustrating the first processing unit according to a third embodiment.

As illustrated in FIG. 11, the first processing unit 5 according to the present embodiment includes a switching processing unit 21 in addition to the tracking target object determination unit 9, the tracked object information obtainment unit 10, the conversion processing unit 11, the tracked object identification unit 12, the determination processing unit 13, the movement direction estimation unit 14, the tracking change processing unit 15, and the communication processing unit 16.

The switching processing unit 21 performs the processing for switching between the first mode and the second mode described above. The specific switching processing will be described with reference to FIG. 12. Note that processing that is the same as that illustrated in FIG. 8 will be given the same reference signs, and descriptions thereof will be omitted as appropriate.

After executing the processing for determining the tracking target object T1 by executing the processing of step S101 and step S102, in step S103, the first processing unit 5 determines whether the tracking target object T1 has been determined. If the tracking target object T1 cannot be determined, the tracking stop instruction in step S104 is transmitted in the same manner as in the first embodiment, and the series of processing ends.

On the other hand, when it has been determined that the tracking target object T1 has been determined, the first processing unit 5 moves the sequence to step S131, where it is determined whether the tracking target object T1 is moving slowly, or is moving regularly.

In this processing, the movement speed of the tracking target object T1 is estimated using information on past frames of the first image GC1 and the like. When the movement speed is less than a predetermined speed, the movement speed of the tracking target object T1 is determined to be low.

Alternatively, in this processing, it is determined whether the movement of the tracking target object T1 is a regular movement, such as a constant velocity linear movement, circular movement, or the like.

Figure 12:
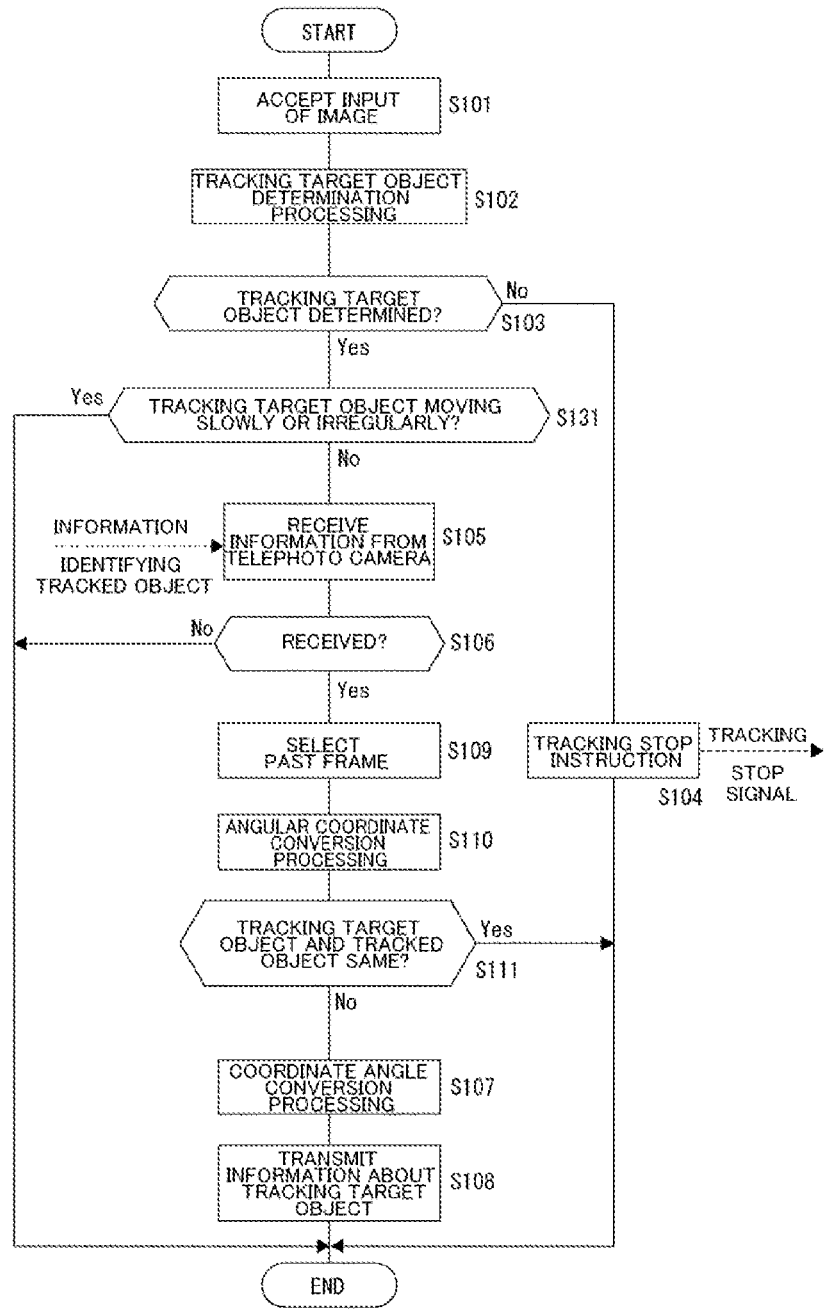
FIG. 12 is a flowchart illustrating an example of processing performed by the first processing unit according to the third embodiment.

If the tracking target object T1 is determined to be moving slowly or regularly, the first processing unit 5 ends the series of processing illustrated in FIG. 12. In other words, the processing for determining whether the tracking target object T1 and the tracked object T2 are the same object is not performed. Through this, the first processing unit 5 does not execute processing for changing the tracked object T2.

In response, the second processing unit 7 performs processing for continuing to track the tracked object T2 based on the second image GC2, i.e., the local tracking processing.

This is because when the tracking target object T1 is moving slowly or regularly, the tracking of the object by the second image capturing unit 6 is likely to be performed normally, i.e., the tracking of an object different from the target is considered to be unlikely. By executing the local tracking processing, the tracking target object T1 can be tracked while reducing the processing load on each processing unit.

However, this does not apply when the first processing unit 5 has not yet transmitted the information on the tracking target object T1 to the second processing unit 7, and the tracking of the tracking target object T1 by the second image capturing unit 6 has not yet been started. In this case, even if the tracking target object T1 is moving slowly or regularly, the coordinate angle conversion processing in step S107 and the processing for transmitting the information about the tracking target object T1 in step S108 are executed.

Note that the processing of steps S107 and S108 may be executed even if the tracking target object T1 is moving slowly or regularly. In other words, the coordinate angle conversion processing may be performed, and the processing for transmitting the information about the tracking target object T1 may be executed. In this case, if the information representing the optical axis direction received by the second processing unit 7 and the actual optical axis direction are shifted by at least a predetermined amount, the second processing unit 7 may determine that the incorrect object is being tracked. The second processing unit 7 then starts tracking the new object based on the information representing the received optical axis direction that has been received.

The first mode can be said to be a state in which the processing of steps S101 to S103, S131 (a determination of "No"), and S105 to S108 in FIG. 12 are looped. Meanwhile, the second mode can be said to be a state in which the processing of steps S101, S102, S103, and S131 (a determination of "Yes") in FIG. 12 are looped.

The switching processing unit that switches between the first mode and the second mode in the third embodiment may be provided in the second processing unit 7.

Figure 13:
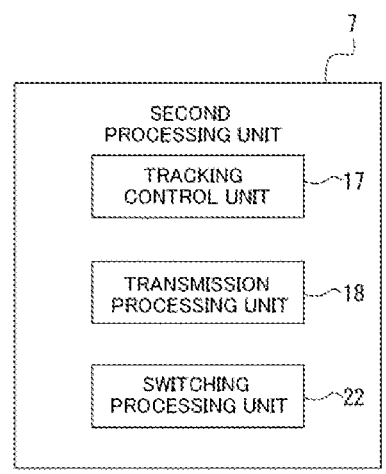
FIG. 13 is a function block diagram illustrating the second processing unit according to the third embodiment.

For example, as illustrated in FIG. 13, the second processing unit 7 includes a switching processing unit 22 in addition to the tracking control unit 17 and the communication processing unit 18.

The switching processing unit 22 performs the processing for switching between the first mode and the second mode described above. The specific switching processing will be described with reference to FIG. 14. Note that processing that is the same as that illustrated in FIG. 9 will be given the same reference signs, and descriptions thereof will be omitted as appropriate.

If the second processing unit 7 has determined that information about the tracking target object T1 has not been received from the wide-angle camera 2 (step S201), and that the tracking is being performed locally (step S202), the local tracking processing of step S203 is executed. As described thus far, this processing is processing that identifies the coordinates of the tracked object T2 in the newest frame and sends an instruction to the PTZ control unit 8 such that the identified coordinates are located at the center of the angle of view.

After executing the local tracking processing, in step S221, the second processing unit 7 performs processing for determining whether the change in the control amount in the local tracking processing is regular.

A case where the change in the control amount in the local tracking processing is regular is, for example, a case where the change in the control amount in the pan direction and the control amount in the tilt direction transmitted to the PTZ control unit 8 are regular. In other words, this is a case where the tracked object T2 is moving regularly during tracking.

If it is determined that the change in the control amount in the local tracking processing is regular, the second processing unit 7 returns the sequence to step S201. Through this, as long as the change in the control amount is regular, the local tracking processing of step S202 is continued until the information is received from the wide-angle camera 2. Alternatively the local tracking processing may be continued until a tracking stop instruction is received from the wide-angle camera 2.

On the other hand, when it is determined that the change in the control amount in the local tracking processing is not regular, in step S204, the second processing unit 7 transmits the information for identifying the tracked object T2 to the wide-angle camera 2, in the same manner as in the first embodiment.

Note that the configuration may be such that when it is determined in step S221 that the control amount is regular, the sequence returns to the processing of step S203.

Figure 14:
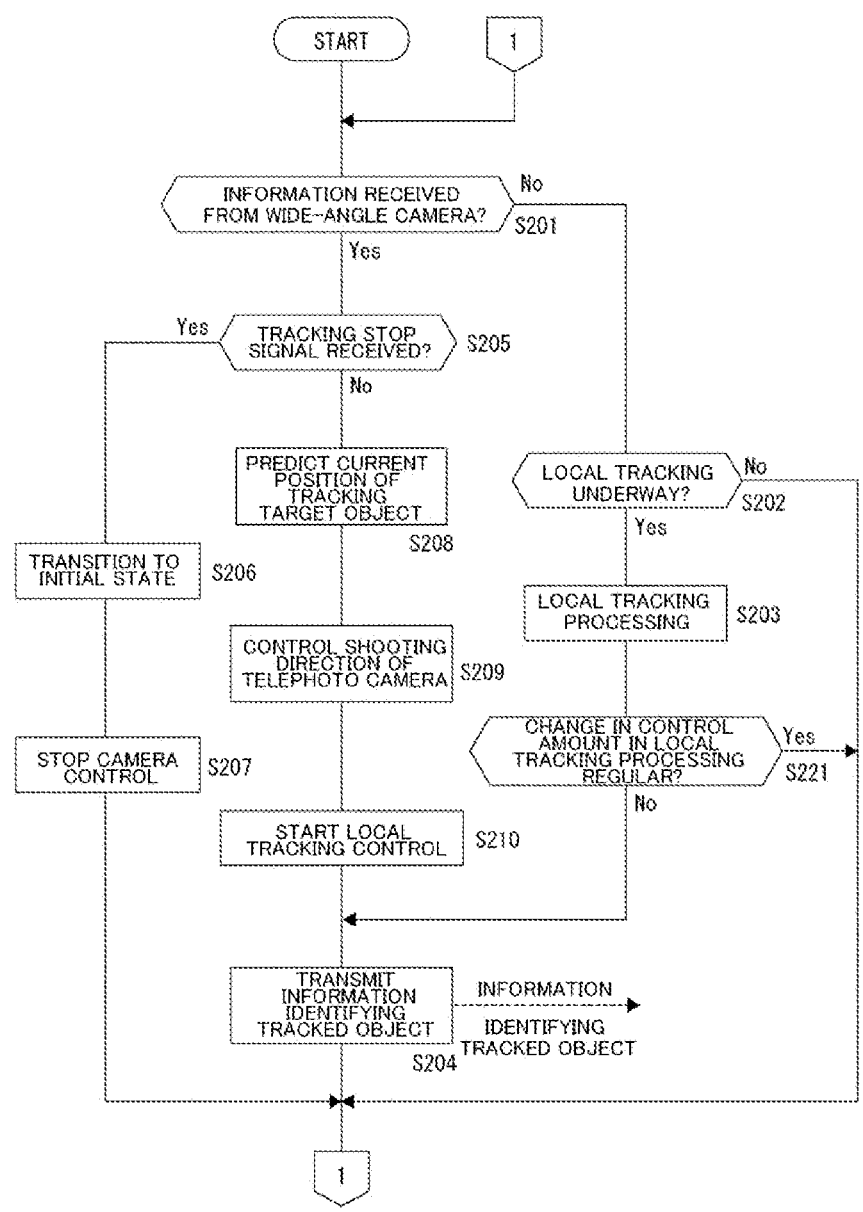
FIG. 14 is a flowchart illustrating an example of processing performed by the second processing unit according to the third embodiment.

The first mode can be said to be a state in which the processing of steps S201 (a determination of "Yes"), S205 (a determination of "No"), S208 to S210, and S204 in FIG. 14 are looped.

Meanwhile, the second mode can be said to be a state in which the processing of steps S201 (a determination of "No"), S202, S203, and S221 (a determination of "Yes") in FIG. 14 are looped.

Although the third embodiment has described an example in which the first processing unit 5 includes the switching processing unit 21 and an example in which the second processing unit 7 includes the switching processing unit 22, the configuration may be such that the first processing unit 5 includes the switching processing unit 21 and the second processing unit 7 includes the switching processing unit 22. In other words, by executing the above-described processing for determining whether the first processing unit 5 and the second processing unit 7 will continue the local tracking processing, respectively, it is easy for the local tracking processing to continue unless needed. This makes it possible to suppress the occurrence of needless communication processing or the like, and thus contribute to reducing the processing load.

7. Fourth Embodiment

A fourth embodiment will describe an example in which the image capturing units and the processing units are provided as separate devices.

Figure 15:
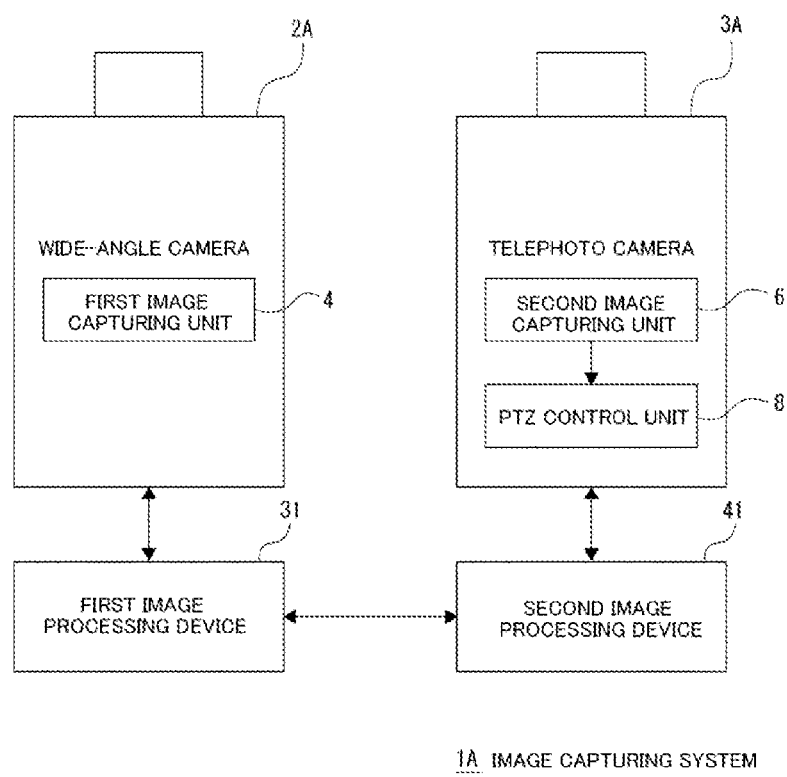
FIG. 15 is a block diagram illustrating an example of the configuration of the image capturing system according to a fourth embodiment.

FIG. 15 illustrates an example of the configuration of an image capturing system 1A according to the fourth embodiment.

The image capturing system 1A includes a wide-angle camera 2A, a telephoto camera 3A, a first image processing device 31, and a second image processing device 41.

The wide-angle camera 2A is configured including the above-described first image capturing unit 4, and further includes a signal processing unit (not shown) that can execute various types of processing for converting image signals captured by the first image capturing unit 4 into image data.

The telephoto camera 3A is configured including the above-described second image capturing unit 6 and PTZ control unit 8, and further includes a signal processing unit (not shown) that can execute various types of processing for converting image signals captured by the second image capturing unit 6 into image data.

The first image processing device 31 is configured having the functionality of the first processing unit 5 provided in the wide-angle camera 2, described above. In other words, the first image processing device 31 includes the tracking target object determination unit 9, the tracked object information obtainment unit 10, the conversion processing unit 11, the tracked object identification unit 12, the determination processing unit 13, the movement direction estimation unit 14, the tracking change processing unit 15, and the communication processing unit 16, and therefore has functionality equivalent to the first processing unit 5 illustrated in FIG. 4.

The second image processing device 41 is configured having the functionality of the second processing unit 7 provided in the telephoto camera 3, described above. In other words, the second image processing device 41 includes various units such as the tracking control unit 17 and the communication processing unit 18, as illustrated in FIG. 4, and therefore has functionality equivalent to that of the second processing unit 7 illustrated in FIG. 4.

At least one of the first image processing device 31 and the second image processing device 41 may include a switching processing unit such as that described in the third embodiment.

By using the wide-angle camera 2A and the first image processing device 31 as separate information processing devices, an information processing device specialized for image processing can be employed as the first image processing device 31, which makes it easy to improve the performance of the first image processing device 31. This makes it possible, for example, to execute the aforementioned various types of processing even if the moving image captured by the first image capturing unit 4 has a higher framerate.

A similar effect can be achieved for the telephoto camera 3A and the second image processing device 41.

8. Fifth Embodiment

A fifth embodiment will describe another example in which the image capturing units and the processing units are provided as separate devices.

Figure 16:
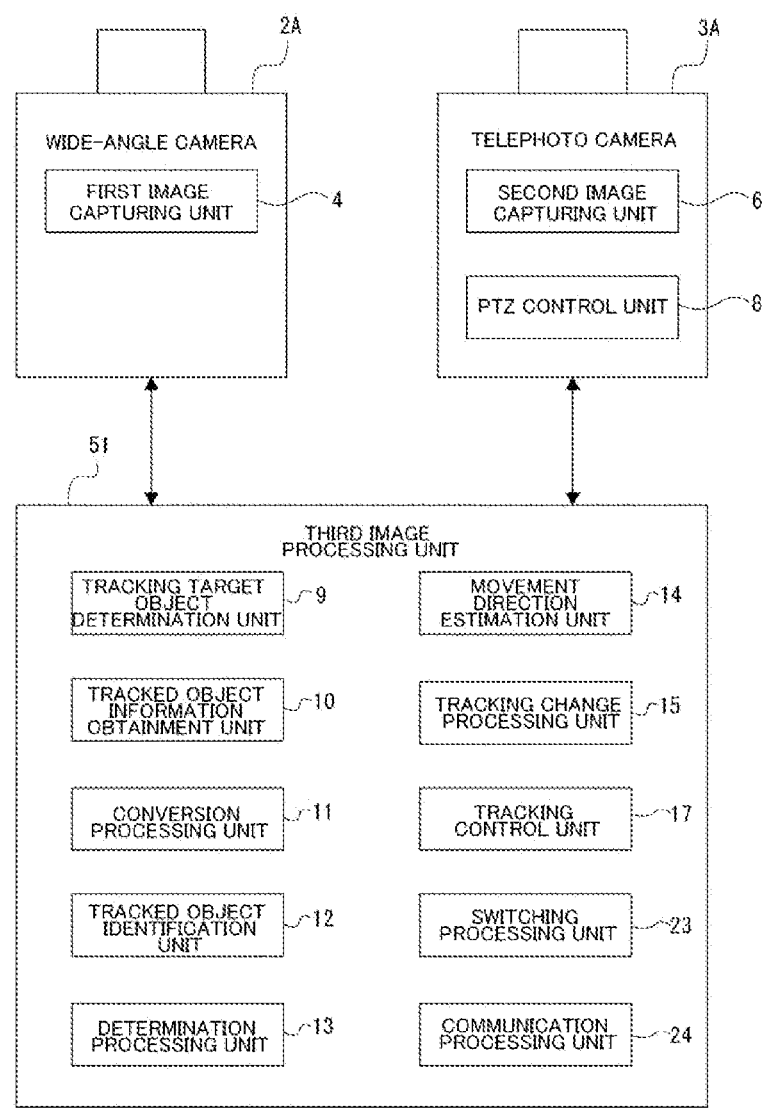
FIG. 16 is a block diagram illustrating an example of the configuration of the image capturing system according to a fifth embodiment.

FIG. 16 illustrates an example of the configuration of an image capturing system 1B according to the fifth embodiment.

The image capturing system 1B includes the wide-angle camera 2A, the telephoto camera 3A, and a third image processing device 51.

The wide-angle camera 2A and the telephoto camera 3A have the same configurations as in the fourth embodiment, and thus descriptions thereof will be omitted.

The third image processing device 51 includes the functionality of both the first image processing device 31 and the second image processing device 41.

However, although the first image processing device 31 has functionality for transmitting and receiving information to and from the second image processing device 41, and the second image processing device 41 has functionality for transmitting and receiving information to and from the first image processing device 31, the third image processing device 51 executes processing for outputting and obtaining information to other units within the device instead.

The third image processing device 51 can communicate with both the wide-angle camera 2A and the telephoto camera 3A, and can obtain both the first image GC1 captured by the first image capturing unit 4 of the wide-angle camera 2A and the second image GC2 captured by the second image capturing unit 6 of the telephoto camera 3A through this communication. The third image processing device 51 can also transmit control information to the PTZ control unit 8 provided in the telephoto camera 3A.

As illustrated in FIG. 16, the third image processing device 51 includes the tracking target object determination unit 9, the tracked object information obtainment unit 10, the conversion processing unit 11, the tracked object identification unit 12, the determination processing unit 13, the movement direction estimation unit 14, the tracking change processing unit 15, the tracking control unit 17, a switching processing unit 23, and a communication processing unit 24.

Like the other embodiments described above, the tracking target object determination unit 9 performs processing for determining the object to be tracked based on the first image GC1 captured by the first image capturing unit 4.

The tracked object information obtainment unit 10 obtains information for identifying the tracked object T2. To this end, the tracked object information obtainment unit 10 performs processing for obtaining control information of the PTZ control unit 8, i.e., information representing the optical axis direction of the second image capturing unit 6, from the telephoto camera 3A. Through this, information for identifying the tracked object T2 is obtained.

Note that when control information transmitted by the third image processing device 51 to the PTZ control unit 8 is stored in a storage area within the third image processing device 51, the tracked object information obtainment unit 10 may obtain the control information from the storage area. In this case, the processing can be performed without obtaining control information from the telephoto camera 3A.

The conversion processing unit 11 converts the coordinates of the object in the first image GC1 and the information representing the optical axis direction of the second image capturing unit 6 of the telephoto camera 3A. The conversion processing unit 11 also converts information representing the optical axis direction of the second image capturing unit 6, received from the telephoto camera 3A, into coordinates in the first image GC1.

The tracked object identification unit 12 identifies the object being tracked by the second image capturing unit 6 from among the objects appearing in the first image GC1, based on the coordinates in the first image GC1 converted by the conversion processing unit 11.

The determination processing unit 13 determines whether the tracked object T2 identified by the tracked object identification unit 12 and the tracking target object T1 determined by the tracking target object determination unit 9 are the same object.

The movement direction estimation unit 14 performs processing for estimating the movement direction of the tracking target object T1.

The tracking change processing unit 15 performs processing for causing the object to be tracked by the second image capturing unit 6, i.e., the tracked object T2, to change. In the present embodiment, the PTZ control unit 8 is caused to execute pan control, tilt control, and the like by transmitting, to the telephoto camera 3A, the information representing the optical axis direction of the second image capturing unit 6 that has been converted from the coordinate information of the tracking target object T1 through the processing by the conversion processing unit 11, and causes the tracked object T2 to be changed to the same object as the tracking target object T1.

The tracking control unit 17 performs various types of processing for the second image capturing unit 6 to properly track the object. Specifically, by performing image processing on the second image GC2 captured by the second image capturing unit 6, the tracked object T2 is identified, the control amount of the pan control, the control amount of the tilt control, and the like for controlling the optical axis direction of the second image capturing unit 6 are determined such that the tracked object T2 is located at the center of the angle of view, and the control amounts are transmitted to the PTZ control unit 8 of the telephoto camera 3A. Note that in this case, the respective control amounts may be determined taking into account the movement direction of the tracked object T2.

The switching processing unit 23 performs processing for determining whether the tracking target object T1 and the tracked object T2 match, and, in accordance therewith, switching between a mode in which the tracking target can be changed (a first mode) and a mode in which the second image capturing unit 6 continues tracking the tracked object T2 without executing that determination processing (a second mode).

The communication processing unit 24 performs communication processing with the wide-angle camera 2A and the telephoto camera 3A to implement the above-described processing according to the present embodiment.

By configuring the image processing device as a single information processing device, as in the present embodiment, costs can be reduced compared to when constructing an image capturing system using a plurality of image processing devices. The information transmission/reception processing between the image processing devices is not performed, which makes it possible to speed up the processing.

9. Variations

Although each of the foregoing examples has described an example in which the tracking target object determination unit 9 automatically executes processing for determining the tracking target object T1, the tracking target object T1 may be determined through manual operations performed by an operator. For example, in a soccer game, the tracking target object T1 may be set by an operator specifying the team to which the player belongs and their number. In this case, the tracking target object determination unit 9 may function as an identifying unit that identifies the player specified by performing image processing on the first image GC1.

Alternatively, an indicator for determining the tracking target object T1 through manual operations by the operator may be presented. For example, the operator may specify a player as "a player who has scored a goal." The tracking target object determination unit 9 identifies the corresponding player by performing image processing using the newest frame to past frames of the first image GC1.

Note that deep learning may be used when performing image processing for determining the tracking target object T1, as in the above-described examples and the present variation.

The information obtained by the tracked object information obtainment unit 10 as the information for identifying the tracked object T2 need not be the above-described information representing the optical axis direction, the information of the second image GC2, or the like. For example, the information may be information that represents the characteristics of the tracked object T2. Various examples are conceivable, such as information on a player's number, hair color, hairstyle, position, shoe color, skin color, and the like.

Instead of executing processing for converting information representing the optical axis direction into coordinate information, the conversion processing unit 11 that has obtained this information performs processing for identifying the tracked object T2 in the first image GC1, and converting the information into coordinate information, by performing the image processing on the first image GC1.

As described above, the image capturing system 1 (1A, 1B) executes processing for determining the tracking target object T1 by performing image processing on the first image GC1. Alternatively, as in the above-described variation, characteristic information of the tracked object T2 is extracted by performing image processing on the second image GC2. Such image processing need not be executed each time the captured image is obtained. For example, while the first image capturing unit 4 and the second image capturing unit 6 capture moving images at 60 fps, 120 fps, or the like, the processing units may perform various types of image processing described above at 30 fps.

This makes it possible to execute tracking processing on an appropriate object while capturing a moving image at a high fps.

When the tracking of the tracked object T2 in the telephoto camera 3 has stopped and the tracking of a newly-specified tracking target object T1 has started, it is possible that the tracking of an incorrect object has started, and thus the information for identifying the tracked object T2 may be transmitted to the wide-angle camera 2 at a high frequency.

Additionally, when the tracked object T2 and another object cross paths, there is a risk that the tracked object T2 will switch unintentionally, and thus information for identifying the tracked object T2 may be transmitted to the wide-angle camera 2 at a high frequency.

If there are a plurality of objects other than the tracking target object T1, or when the number is greater than a predetermined number (a predetermined number of players), there is a high probability that the incorrect object will be tracked, and thus the frequency at which the wide-angle camera 2 transmits information about the tracking target object T1 may be increased.

Additionally, the frequency at which the information about the tracking target object T1 is transmitted may be increased when another object is within a predetermined distance from the tracking target object T1.

10. Conclusion

As described in the various foregoing examples, the wide-angle camera 2 (or the first image processing device 31, or the third image processing device 51) includes: the tracking target object determination unit 9 that determines an object targeted for tracking as the tracking target object T1 based on the first image GC1 captured by the first image capturing unit 4; the tracked object information obtainment unit 10 that obtains information for identifying the tracked object T2 that is an object being tracked by the second image capturing unit 6; the determination processing unit 13 that determines whether the tracked object T2 and the tracking target object T1 are the same object; and the tracking change processing unit 15 that performs processing for changing the tracked object T2 tracked by the second image capturing unit 6 to the tracking target object T1 when the tracked object T2 and the tracking target object T1 are determined not to be the same.

Through this, processing for changing the tracking target is executed when the object being tracked by the second image capturing unit 6 is different from the tracking target object T1, which is the target object assumed.

This prevents tracking of an object different from the tracking target object T1 from continuing. Meanwhile, even if the object is moving irregularly, another object has been taken as the tracked object T2 due to objects crossing each other's paths, or the like, processing for changing the tracking target is executed, which makes it possible to return to a state of tracking the correct object.

As described with reference to FIG. 4 and the like, in the wide-angle camera 2 (or the first image processing device 31), the tracked object information obtainment unit 10 may obtain the information for identifying the tracked object T2 from another image processing device (e.g., the telephoto camera 3 or the second image processing device 41), and the tracking change processing unit 15 may perform processing for transmitting information on the tracking target object T1 to the other image processing device as the processing for changing.

For example, processing for changing the tracking target is realized by exchanging information between two devices, namely the image processing device having this configuration and the other image processing device.

Such a configuration is, for example, the wide-angle camera 2 that combines the functionality of the first image capturing unit 4 with the functionality of the image processing device having this configuration, the telephoto camera 3 that has the functionality of the second image capturing unit 6 and the functionality of the other image processing device, and so on. Additionally, the configuration may include four devices: the wide-angle camera 2A provided with the first image capturing unit 4; the first image processing device 31 provided with the functionality of this configuration, provided corresponding to the wide-angle camera 2A; the telephoto camera 3A provided with the second image capturing unit 6; and another image processing device (the second image processing device 41) provided in correspondence with the telephoto camera 3A.

By having the devices transmit and receive information to and from each other in such a configuration, the telephoto camera 3A can be controlled such that the tracking target object T1 determined from the first image GC1 obtained by the wide-angle camera 2A is tracked. Then, if the tracking control of the telephoto camera 3A is tracking an object different from the intended object, processing for changing the tracking target object T1 can be executed, making it possible to prevent the incorrect object from continuing to be tracked.

As described with reference to FIG. 4 and the like, in the wide-angle camera 2 (or the first image processing device 31), the tracking change processing unit 15 may transmit information for changing the optical axis direction of the second image capturing unit 6 to the other image processing device (e.g., the telephoto camera 3 or the second image processing device 41) as the information on the tracking target object T1.

For example, the position of the tracking target object T1 within the first image GC1 captured by the first image capturing unit 4 (or within the angle of view of the first image capturing unit 4) and the setting of the optical axis direction of the second image capturing unit 6 for capturing the tracking target object T1 within the angle of view of the second image capturing unit 6 can be associated one-to-one.

In particular, when the first image capturing unit 4 and the second image capturing unit 6 are disposed in positions close to each other, and the respective image capturing units and the object are at least a certain distance from each other, it is easy to associate the position of the tracking target object T1 in the first image GC1 and the optical axis direction of the second image capturing unit 6.

In such a case, information for adjusting the optical axis direction can be used instead of information such as features including the color, shape, and size of the tracking target object T1, the position, and the like. Then, by transmitting information for adjusting the optical axis direction to a control unit that controls the composition of the second image capturing unit 6 (the PTZ control unit 8), the control unit can be notified of the tracking target object T1. Furthermore, this information does not require processing for identifying an object, detecting an object, or the like through image processing or the like, which avoids increasing the processing load on the tracking change processing unit 15 and is therefore favorable.

The above-described information for changing the optical axis direction of the second image capturing unit 6 may be, for example, information calculated each time using a conversion formula for calculating the optical axis direction of the second image capturing unit 6 from the position of the tracking target object T1 in the first image GC1, or may be information obtained by using a conversion table corresponding to the position of the tracking target object T1 in the first image GC1 and the optical axis direction of the second image capturing unit 6.

Additionally, the information for changing the optical axis direction of the second image capturing unit 6 may be information such as numerical values representing the optical axis direction, or information on control amounts in the pan direction and the tilt direction for the second image capturing unit 6 controlled by a control unit (the PTZ control unit 8). The control amounts in the pan direction and the tilt direction may be absolute values, or may be values relative to the current values.

Additionally, the information representing the optical axis direction may be information determined such that the tracking target object T1 is located at the center of the frame of the telephoto camera 3, or may be information determined such that the tracking target object T1 is located at a predetermined location other than the center of the frame of the telephoto camera 3.

Alternatively, information pertaining to a direction in which the object is to be captured in the center of the frame may be used as the information representing the optical axis direction. The telephoto camera 3, which has received such information, may determine the actual optical axis direction based on the information received after determining at which position of the frame the tracking target object T1 is to be located. In other words, the optical axis direction indicated by the received information may be different from the actual optical axis direction.

As described with reference to FIG. 4 and the like, in the wide-angle camera 2 (or the first image processing device 31), the tracking change processing unit 15 may lower the frequency of processing for transmitting to the other image processing device (e.g., the telephoto camera 3 or the second image processing device 41) when the tracked object T2 and the tracking target object T1 are determined to be the same.

When the object being tracked by the second image capturing unit 6 is the tracking target object T1, it is sufficient to continue tracking the object being tracked. Such processing is processing that can be executed without newly providing the information of the tracking target object T1.

According to this configuration, as long as the tracking target object T1 and the tracked object T2 are the same object, the frequency of transmitting information about the tracking target object T1 from the image processing device (the wide-angle camera 2, the first image processing device 31, or the like) to the other image processing device (the telephoto camera 3, the second image processing device 41, or the like) decreases, making it possible to both reduce the processing load required for the communication processing and reduce consumption of communication bandwidth.

Note that the transmission frequency may be reduced by skipping the transmission processing once every several times, or may be reduced by not performing the transmission processing at all.

As described with reference to FIG. 4 and the like, the wide-angle camera 2 (or the first image processing device 31) may include a movement direction estimation unit 14 that estimates the movement direction of the tracking target object T1, and the tracking change processing unit 15 may perform processing for transmitting the movement direction in addition to the information on the tracking target object T1 to the other image processing device (e.g., the telephoto camera 3 or the second image processing device 41) as the processing for changing.

It is assumed that the object is moving during a period from when the second image GC2 is shot by the second image capturing unit 6, to when the tracking target object T1 is determined based on the first image GC1 captured by the first image capturing unit 4, the object being tracked by the second image capturing unit 6 is identified as the tracked object T2 based on information transmitted from the image processing device controlling the second image capturing unit 6 (the telephoto camera 3, the second image processing device 41, or the like), whether the tracking target object T1 and the tracked object T2 are the same object is determined, and information on the tracking target object T1 is transmitted to another image processing device in accordance therewith. Then, by the time the second image capturing unit 6 has finished changing the composition of the second image capturing unit 6 in order to track the new tracking target object T1, the tracking target object T1 may not already be located within the angle of view of the second image capturing unit 6.

In such a case, there is a risk that the tracking of the tracking target object T1 cannot be started. Accordingly, estimating the movement direction of the tracking target object T1 and transmitting that information to the other image processing device makes it possible to increase the likelihood of the tracking target object T1 being captured within the angle of view of the second image capturing unit 6. Furthermore, as long as a state where the tracking target object T1 cannot be captured within the angle of view of the second image capturing unit 6 continues, continuing to transmit the information on the tracking target object T1 and the information on the movement direction from the image processing device having this configuration to the other image processing device prevents a situation where the tracking target object T1 cannot be captured within the angle of view of the second image capturing unit 6 from continuing.

As described with reference to FIG. 4 and the like, in the wide-angle camera 2 (or the first image processing device 31, or the third image processing device 51), the movement direction estimation unit 14 may estimate the movement direction based on a past image captured by the first image capturing unit 4 (a past image in the first image GC1).

For example, the movement direction of the object serving as the tracking target object T1 can be estimated by using the first image GC1 from several past frames.

Then, by transmitting information about the movement direction to the other image processing device (the telephoto camera 3, the second image processing device 41, or the like), the other image processing device can control the pan direction and the tilt direction for the second image capturing unit 6 such that the tracking target object T1 falls within the angle of view of the second image capturing unit 6. This makes it possible to increase the likelihood of the correct object being tracked by the second image capturing unit 6.

Note that information about the movement speed as well as the movement direction of the tracking target object T1 may be estimated and transmitted to the other image processing device. This makes it possible to further increase the likelihood that the correct object will be tracked.

As described with reference to FIG. 4 and the like, in the wide-angle camera 2 (or the first image processing device 31, or the third image processing device 51), the determination processing unit 13 may determine whether the objects are the same using the first image GC1 selected based on the capture time of a second image GC2, among the second images GC2 captured by the second image capturing unit 6, from which information for identifying the tracked object T2 is obtained.

Considering a case where the information for identifying the tracked object T2 has been extracted based on the second image GC2 captured by the second image capturing unit 6, and the extracted information has been transmitted to an image processing device having this configuration (the wide-angle camera 2, the first image processing device 31, the third image processing device 51), the position of the tracking target object T1 in the first image GC1 captured after a certain length of time has passed since the second image GC2 was captured may be different from the position at the capture time of the second image GC2. In such a situation, for example, if the tracked object T2 is estimated by the second image capturing unit 6 based on the newest first image GC1, the object being tracked may be incorrectly identified in the second image capturing unit 6.

As a result, there may be a delay in detecting that the second image capturing unit 6 is tracking an incorrect object. However, according to this configuration, the identification of the object being tracked by the second image capturing unit 6 is performed using the first image GC1 captured at a timing close to the capture time of the second image GC2, which prevents errors in the identification of the tracked object T2. This makes it possible to promptly detect that the second image capturing unit 6 is tracking an incorrect object, which makes it possible to quickly transition to a state in which the tracking target object T1 is correctly tracked. This makes it possible to minimize the effect of latency on the data transfer.

As described with reference to FIG. 8, FIG. 9, and the like, the wide-angle camera 2 (or the first image processing device 31) may further include the switching processing unit 21 (the switching processing unit 23) that switches between a first mode, in which the processing by the determination processing unit 13 for determining whether the objects are the same and the processing by the tracking change processing unit 15 for transmitting the information on the tracking target object T1 to the other image processing device (the telephoto camera 3 or the second image processing device 41) are executed, and a second mode, in which the processing by the determination processing unit 13 and the processing by the tracking change processing unit 15 are not executed.

Comparing the first mode with the second mode, it is assumed that the second mode is a simpler mode of control and also has a smaller processing load.

Specifically, compared to the first mode, in which processing for determining whether the tracking target object T1 and the tracked object T2 are the same object is performed, various types of information are transmitted and received in order to make that determination, and the like, the second mode is simpler processing in which only the tracking of the object being tracked continues as a result of the processing by the other image processing device (the telephoto camera 3 or the second image processing device 41) and the second image capturing unit 6.

Accordingly, providing the switching processing unit 21 (the switching processing unit 23) makes it possible to switch to the second mode when control according to the first mode is unnecessary, which makes it possible to reduce the processing load on the image processing device and the other image processing device.

As described with reference to FIG. 8, FIG. 9, and the like, in the wide-angle camera 2 (or the first image processing device 31), the switching processing unit 21 (the switching processing unit 23) may switch between the first mode and the second mode according to a movement mode of the tracking target object T1 determined.

For example, a case where the movement direction of the tracking target object T1 is constant or the tracking target object T1 remains within a predetermined range, or a case where the tracking target object T1 is moving slowly, can be said to be cases where there is little risk of losing the object being tracked due to the processing closed to the second image capturing unit 6 and the other image processing device (the telephoto camera 3 or the second image processing device 41).

By switching to the second mode in such a case, the processing load on the image processing device and the other image processing device can be reduced.

As described with reference to FIG. 2 and the like, the wide-angle camera 2 may further include the first image capturing unit 4.

For example, the image processing device is a camera device including the first image capturing unit 4.

In such a camera device (the wide-angle camera 2), processing for changing the tracking target is executed when the object being tracked by the second image capturing unit 6 is different from the tracking target object T1, which is the target object assumed. This makes it possible to prevent tracking of an object different from the tracking target object T1 from continuing.

As described in the foregoing examples, the telephoto camera 3 (or the second image processing device 41, or the third image processing device 51) includes the tracking control unit 17 that controls tracking of an object by the second image capturing unit 6 unit using information on the tracking target object T1 that is an object targeted for tracking determined based on the first image GC1 captured by the first image capturing unit 4. The tracking control unit 17: outputs information for identifying the tracked object T2 that is an object being tracked; controls the tracking without changing the tracking target object T1 when information on the tracking target object T1 is not obtained during the control of the tracking; and performs tracking control for tracking an object identified based on newly-obtained information on the tracking target object T1, when the information on the tracking target object T1 is obtained during the control of the tracking.

This makes it possible for the tracking control unit 17 to continue the tracking by the second image capturing unit 6 by executing simple processing when the information on the new tracking target object T1 has not been obtained.

This in turn makes it possible to reduce the processing load on the image processing device (the telephoto camera 3, the second image processing device 41, or the third image processing device 51) until the information on the new tracking target object T1 is obtained. Additionally, when the information on the new tracking target object T1 is obtained, an incorrect object being tracked can be prevented by starting the new tracking based on the information on the new tracking target object T1.

As described with reference to FIG. 4 and the like, the telephoto camera 3 (or the second image processing device 41) may further include: a reception processing unit (the communication processing unit 18) that receives information on the tracking target object T1 from another image processing device (the wide-angle camera 2 or the first image processing device 31); and a transmission processing unit (the communication processing unit 18) that transmits, to the other image processing device, the information for identifying the tracked object T2 output by the tracking control unit 17. The tracking control unit 17: controls the tracking without changing the tracking target object T1 when the information on the tracking target object T1 is not received by the reception processing unit during the control of the tracking; and performs tracking control for tracking an object identified based on newly-obtained information on the tracking target object T1, when the information on the tracking target object T1 is received by the reception processing unit during the control of the tracking.

For example, processing for continuing to track the object determined as the tracked object T2, processing for stopping the tracking of the tracked object T2, and processing for starting tracking of the newly-specified tracking target object T1 is executed by exchanging information between two image processing devices, namely the image processing device having the present configuration (the telephoto camera 3 or the second image processing device 41) and another image processing device (the wide-angle camera 2 or the first image processing device 31).

Such a configuration is, for example, the telephoto camera 3 that has the functionality of the second image capturing unit 6 and the functionality of the image processing device having this configuration, the wide-angle camera 2 that has the functionality of the first image capturing unit 4 and the functionality of the other image processing device, and so on. Additionally, the configuration may include four devices: the telephoto camera 3A provided with the second image capturing unit 6; the image processing device provided with the functionality of this configuration, corresponding to the telephoto camera 3A (the second image processing device 41); the wide-angle camera 2A provided with the first image capturing unit 4; and another image processing device provided in correspondence with the wide-angle camera 2A (the first image processing device 31).

By having the devices transmit and receive information to and from each other in such a configuration, the telephoto camera 3A can be controlled such that the tracking target object T1 determined based on the first image GC1 obtained by the wide-angle camera 2A is tracked. Then, when an object different from the object intended to be subject to the tracking control of the telephoto camera 3A is being tracked, executing control for tracking the newly-designated tracking target object T1 makes it possible to prevent a situation where the incorrect object continues being tracked.

As described with reference to FIG. 4 and the like, in the telephoto camera 3 (or the second image processing device 41), the transmission processing unit (the communication processing unit 18) may transmit information for identifying the tracked object T2 each time a captured image is generated by the second image capturing unit 6.

This makes it possible to transmit information for identifying the tracked object T2 to the other image processing device (the wide-angle camera 2 or the first image processing device 31) at a high frequency.

Then, the other image processing device receiving the information for identifying the tracked object T2 at a high frequency makes it possible to determine whether the tracked object T2 is different from the tracking target object T1 on a frame-by-frame basis, and thus a state where the tracked object T2 tracked by the second image capturing unit 6 is different from the tracking target object T1 can be detected promptly. Accordingly, an instruction to set the tracked object T2 tracked by the second image capturing unit 6 to the intended object can be made. Additionally, the situation in which the second image capturing unit 6 is tracking an object that is different from the intended object can be prevented from continuing for a long period of time.

As described with reference to FIG. 4 and the like, in the telephoto camera 3 (or the second image processing device 41), the transmission processing unit (the communication processing unit 18) may transmit the information pertaining to the optical axis direction of the second image capturing unit 6 as the information for identifying the tracked object T2.

The information pertaining to the optical axis direction may be vector information that can uniquely identify the optical axis direction of the second image capturing unit 6 in a predetermined coordinate system, or may be information such as the control amounts for the pan direction and the tilt direction corresponding one-to-one to the optical axis direction of the second image capturing unit 6.

For example, when the position of the tracking target object T1 in the first image GC1 and the information pertaining to the optical axis direction of the second image capturing unit 6 can be associated with each other in the other image processing device (the wide-angle camera 2 or the first image processing device 31), the other image processing device can identify the optical axis direction of the second image capturing unit 6 by having information pertaining to the optical axis direction, such as that described above, transmitted to the other image processing device.

Accordingly, the other image processing device can execute processing for determining whether the tracking target object T1 determined from the first image GC1 matches the tracked object T2 being tracked by the second image capturing unit 6, and the correct object can be tracked by the second image capturing unit 6.

As described with reference to FIG. 9 and the like, in the telephoto camera 3 (or the second image processing device 41), the transmission processing unit (the communication processing unit 18) may transmit the second image GC2 captured by the second image capturing unit 6 as the information for identifying the tracked object T2.

Depending on the configuration of the second image capturing unit 6 and the devices for adjusting the orientation thereof, there are situations where the information pertaining to the optical axis direction of the second image capturing unit 6 cannot be obtained. In such a case, the information on the second image GC2 captured by the second image capturing unit 6 may be transmitted to the other image processing device (the wide-angle camera 2 or the first image processing device 31), as in the present configuration.

On the other hand, in the other image processing device, the tracked object T2 can be identified from the second image GC2 by performing block matching processing, matching processing using feature points, or the like. Specifically, the location, in the first image GC1, of an object included in the second image GC2 is identified. Then, by comparing the position of the object in the first image GC1 with the position of the tracking target object T1, whether the correct object is being tracked by the second image capturing unit 6 can be determined. This makes it possible to redo the control such that the correct object is tracked when the tracked object T2 being tracked by the second image capturing unit 6 is different from the tracking target object T1.

As described with reference to FIG. 4 and the like, in the telephoto camera 3 (or the second image processing device 41), the reception processing unit (the communication processing unit 18) may receive information on the movement direction of the tracking target object T1 from the other image processing device (the wide-angle camera 2 or the first image processing device 31), and the tracking control unit 17 may perform control for the tracking using the predicted position of the tracking target object T1 calculated based on the capture time of the first image GC1 and the movement direction received.

It is conceivable that the position of the tracking target object T1 at the point in time when the tracking target object T1 is determined based on the first image GC1, and the position of the tracking target object T1 at the point in time when the image processing device receives the information about the tracking target object T1 and performs control such that the tracking target object T1 is captured within the angle of view of the second image capturing unit 6, are different due to movement of the tracking target object T1. In such a case, the image processing device receiving information about the movement direction of the tracking target object T1 makes it possible to estimate the current position of the tracking target object T1.

Accordingly, the orientation of the second image capturing unit 6 can be controlled in accordance with the current position of the estimated tracking target object T1, which makes it possible to increase the likelihood that the tracking of the tracking target object T1 can be started normally.

By receiving information about the movement direction as well as the movement speed of the tracking target object T1, the image processing device can increase the likelihood that the tracking target object T1 will be captured within the angle of view of the second image capturing unit 6, which makes it possible to perform more appropriate tracking processing.

As described with reference to FIGS. 13, 14, and the like, the telephoto camera 3 (or the second image processing device 41) may further include the switching processing unit 22 that switches between a first mode, in which the processing by the transmission processing unit (the communication processing unit 18) for transmitting the information for identifying the tracked object T2 output by the tracking control unit 17 to the other image processing device (the wide-angle camera 2 or the first image processing device 31), and the processing by the tracking control unit 17 for performing tracking control for tracking an object identified based on newly-obtained information on the tracking target object T1, and a second mode, in which control of the tracking is continued without changing the tracking target object T1. The switching processing unit 22 may also be the switching processing unit 23 provided in the third image processing device 51.

Comparing the first mode with the second mode, it is assumed that the second mode is a simpler mode of control and also has a smaller processing load. Specifically, the processing for continuing to track the tracked object T2 is assumed to be simpler processing, with a lighter processing load, than the processing for starting to track a new object based on information on a new tracking target object T1. In particular, when the tracking of a new object is started, there are cases where the new object is different from the tracking target object T1 and the like, and in such cases, it is necessary to identify the new object again and start the tracking.

Accordingly, providing the switching processing unit 22 makes it possible to switch to the second mode when control according to the first mode is unnecessary, which makes it possible to reduce the processing load on the image processing device and the other image processing device. Additionally, when switching from the first mode to the second mode, the switching processing unit 22 may execute processing for notifying the other image processing device that controls the first image capturing unit 4 (the wide-angle camera 2 or the first image processing device 31) to that effect. This makes it possible for the other image processing device to avoid executing various types of processing for implementing the first mode, and makes it possible to reduce the processing load. The switching processing unit 22 may be provided as the switching processing unit 21 only in the other image processing device that controls the first image capturing unit 4, and in this case, the image processing apparatus device having this configuration can implement the functionality of the switching processing unit 22 simply by performing processing in accordance with instructions from the other image processing device.

As described with reference to FIGS. 13, 14, and the like, in the telephoto camera 3 (or the second image processing device 41), the switching processing unit 22 may switch between the first mode and the second mode according to the movement mode of the tracked object T2 tracked by the tracking control unit 17. For example, when the movement direction of the tracked object T2 is constant or remains within a predetermined range, or a case where the movement speed of the tracked object T2 is low, it is possible to continue tracking the tracked object T2 without obtaining information from another image processing device (the wide-angle camera 2 or the first image processing device 31). In other words, such a case can be said to be a case in which there is little risk of losing the tracked object T2.

By switching to the second mode in such a case, the processing load on the image processing device (the telephoto camera 3 or the second image processing device 41) and the other image processing device (the wide-angle camera 2 or the first image processing device 31) can be reduced.

As described with reference to FIG. 2 and the like, the telephoto camera 3 may further include the second image capturing unit 6.

For example, the image processing device is a camera device including the second image capturing unit 6.

In such a camera device (the telephoto camera 3), it is possible for the tracking control unit 17 to continue the tracking by the second image capturing unit 6 by executing simple processing when the information on the new tracking target object T1 has not been obtained. This in turn makes it possible to reduce the processing load on the image processing device (the telephoto camera 3) until the information on the new tracking target object T1 is obtained. Additionally, when the information on the new tracking target object T1 is obtained, an incorrect object being tracked can be prevented by starting the new tracking based on the information on the new tracking target object T1.

An image processing system constituted by the wide-angle camera 2 and the telephoto camera 3 (the image capturing system 1), or an image processing system constituted by the first image processing device 31 and the second image processing device 41, or an image processing system constituted by the third image processing device 51, includes: the tracking target object determination unit 9 that determines the object targeted for tracking as the tracking target object T1 based on the first image GC1 captured by the first image capturing unit 4; the tracking control unit 17 that controls the tracking of an object by the second image capturing unit 6 using information on the tracking target object T1; the tracked object identification unit 12 that identifies the object being tracked by the second image capturing unit 6 as the tracked object T2 based on information output by the tracking control unit 17; the determination processing unit 13 that determines whether the tracking target object T1 determined and the tracked object T2 identified are a same object; and the tracking change processing unit 15 that outputs information about the tracking target object T1 to the tracking control unit 17 when the tracked object T2 and the tracking target object T1 are not the same. The tracking control unit 17: performs tracking control for tracking an object identified based on newly-obtained information on the tracking target object T1, when information about the tracking target object T1 is input during control of the tracking; and performs the tracking without changing the tracking target object T1 when information about the tracking target object T1 is not input during control of the tracking.

By using such an image processing system, the various effects described above can be achieved.

Here, a program that causes, for example, a CPU, a Digital Signal Processor (DSP), or the like, or a device including these, to execute processing performed by the first processing unit 5 (or the first image processing device 31, or the third image processing device 51), the second processing unit 7 (or the second image processing device 41, or the third image processing device 51), and the like described with reference to the drawings can be considered as an embodiment for realizing the various types of processing described above.

In other words, a program serving as an embodiment of the first processing unit 5 (or the first image processing device 31, or the third image processing device 51) is a program readable by a computer device, which causes the computer device to implement: a tracking target object determination function that determines the object targeted for tracking as the tracking target object T1 based on the first image GC1 captured by the first image capturing unit 4; a tracked object information obtainment function that obtains information for identifying the tracked object T2 that is an object being tracked by the second image capturing unit 6; a determination function that determines whether the tracked object T2 and the tracking target object T1 are the same object; and a tracking change function that changes the tracked object T2 tracked by the second image capturing unit 6 to the tracking target object T1 when the tracked object T2 and the tracking target object T1 are determined not to be the same.

Additionally, a program serving as an embodiment of the second processing unit 7 (or the second image processing device 41, or the third image processing device 51) is a program which causes a computer device to implement: tracking control processing for controlling tracking of an object by the second image capturing unit 6 using information on the tracking target object T1 that is an object targeted for tracking determined based on the first image GC1 captured by the first image capturing unit 4; processing for outputting information for identifying the tracked object T2 specified as the object for which tracking is to be controlled, while the tracking is being controlled; processing for controlling the tracking without changing the tracking target object T1 when the information on the tracking target object T1 is not obtained during the control of the tracking; and processing for performing tracking control for tracking an object identified based on newly-obtained information on the tracking target object T1, when the information on the tracking target object T1 is obtained during the control of the tracking.

Through such a program, the above-described first processing unit 5 (or the first image processing device 31, or the third image processing device 51), second processing unit 7 (or the second image processing device 41, or the third image processing device 51), and the like can be implemented as devices in the image capturing systems 1, 1A, and 1B.

The program can be recorded in advance in an HDD serving as a recording medium embedded in a device such as a computer device or a ROM or the like in a microcomputer that includes a CPU.

Alternatively, the program can be stored (recorded) temporarily or permanently on a removable recording medium such as a flexible disc, a compact disc read-only memory (CD-ROM), a magneto optical (MO) disc, a digital versatile disc (DVD), a Blu-ray Disc (registered trademark), a magnetic disk, a semiconductor memory, or a memory card. The removable recording medium can be provided as what is known as package software.

The program can be installed from the removable recording medium on a personal computer or the like and can also be downloaded from a download site via a network such as a local area network (LAN) or the Internet.

Such a program is suited for providing a broad scope for the first processing unit 5 (or the first image processing device 31, or the third image processing device 51), the second processing unit 7 (or the second image processing device 41, or the third image processing device 51), and the like of the embodiments. For example, by downloading the program to a personal computer, a portable information processing device, a mobile phone, a game console, a video device, a personal digital assistant (PDA), or the like, it is possible to cause the personal computer or the like to function as a device that implements the processing of the rendering unit 11a of the present disclosure.

An information processing method executed by the first processing unit 5 (or the first image processing device 31, or the third image processing device 51) to implement the above-described image capturing systems 1, 1A, and 1B is realized by an information processing device executing: tracking target object determination processing for determining the object targeted for tracking as the tracking target object T1 based on the first image GC1 captured by the first image capturing unit 4; tracked object information obtainment processing for obtaining information for identifying the tracked object T2 that is an object being tracked by the second image capturing unit 6; determination processing for determining whether the tracked object T2 and the tracking target object T1 are the same object; and tracking change processing for changing the tracked object T2 tracked by the second image capturing unit 6 to the tracking target object T1 when the tracked object T2 and the tracking target object T1 are determined not to be the same.

Additionally, an information processing method executed by the second processing unit 7 (or the second image processing device 41, or the third image processing device 51) is realized by an information processing device executing: tracking control processing for controlling tracking of an object by the second image capturing unit 6 using information on the tracking target object T1 that is an object targeted for tracking determined based on the first image GC1 captured by the first image capturing unit 4; processing for outputting information for identifying the tracked object T2 specified as the object for which tracking is to be controlled, while the tracking is being controlled; processing for controlling the tracking without changing the tracking target object T1 when the information on the tracking target object T1 is not obtained during the control of the tracking; and processing for performing tracking control for tracking an object identified based on newly-obtained information on the tracking target object T1, when the information on the tracking target object T1 is obtained during the control of the tracking.

Note that the effects described in the present specification are merely exemplary and not intended to be limiting, and other effects may be provided as well.

11. Present Technique

The present technique can also be configured as follows.

(1)

An image processing device including:
a tracking target object determination unit that determines an object targeted for tracking as a tracking target object based on a first image captured by a first image capturing unit;
a tracked object information obtainment unit that obtains information for identifying a tracked object that is an object being tracked by a second image capturing unit;
a determination processing unit that determines whether the tracked object and the tracking target object are a same object; and a tracking change processing unit that performs processing for changing the tracked object tracked by the second image capturing unit to the tracking target object when the tracked object and the tracking target object are determined not to be the same.

(2)

The image processing device according to (1),
wherein the tracked object information obtainment unit obtains the information for identifying the tracked object from another image processing device, and the tracking change processing unit performs processing for transmitting information on the tracking target object to the other image processing device as the processing for changing.

(3)

The image processing device according to (2),
wherein the tracking change processing unit transmits information for changing an optical axis direction of the second image capturing unit to the other image processing device as the information on the tracking target object.

(4)

The image processing device according to any one of (2) to (3),
wherein the tracking change processing unit lowers a frequency of processing for transmitting to the other image processing device when the tracked object and the tracking target object are determined to be the same.

(5)

The image processing device according to any one of (2) to (4), further including: a movement direction estimation unit that estimates a movement direction of the tracking target object,
wherein the tracking change processing unit performs processing for transmitting the movement direction in addition to the information on the tracking target object to the other image processing device as the processing for changing.

(6)

The image processing device according to (5), wherein the movement direction estimation unit estimates the movement direction based on a past image captured by the first image capturing unit.

(7)

The image processing device according to any one of (2) to (6),
  wherein the determination processing unit determines whether the objects are the same using the first image selected based on a capture time of a second image, among second images captured by the second image capturing unit, from which information for identifying the tracked object is obtained.

(8)

The image processing device according to any one of (2) to (7), further including:
  a switching processing unit that switches between a first mode in which processing by the determination processing unit and processing by the tracking change processing unit are executed, and a second mode in which processing by the determination processing unit and processing by the tracking change processing unit are not executed.

(9)

The image processing device according to (8),
  wherein the switching processing unit switches between the first mode and the second mode according to a movement mode of the tracking target object determined.

(10)

The image processing device according to any one of (2) to (9), further including: the first image capturing unit.

(11)

An image processing device including:
  a tracking control unit that controls tracking of an object by a second image capturing unit using information on a tracking target object that is an object targeted for tracking determined based on a first image captured by a first image capturing unit,
  wherein the tracking control unit:
  outputs information for identifying a tracked object that is an object being tracked;
  controls the tracking without changing the tracking target object when information on the tracking target object is not obtained during the control of the tracking; and
  performs tracking control for tracking an object identified based on newly-obtained information on the tracking target object, when the information on the tracking target object is obtained during the control of the tracking.

(12)

The image processing device according to (11), further including:
  a reception processing unit that receives information on the tracking target object from another image processing device; and
  a transmission processing unit that transmits, to the other image processing device, the information for identifying the tracked object output by the tracking control unit,
  wherein the tracking control unit:
  controls the tracking without changing the tracking target object when the information on the tracking target object is not received by the reception processing unit during the control of the tracking; and
  performs tracking control for tracking an object identified based on newly-obtained information on the tracking target object, when the information on the tracking target object is received by the reception processing unit during the control of the tracking.

(13)

The image processing device according to (12),
  wherein the transmission processing unit transmits information for identifying the tracked object each time a captured image is generated by the second image capturing unit.

(14)

The image processing device according to any one of (12) to (13),
  wherein the transmission processing unit transmits information pertaining to an optical axis direction of the second image capturing unit as the information for identifying the tracked object.

(15)

The image processing device according to any one of (12) to (14),
  wherein the transmission processing unit transmits a second image captured by the second image capturing unit as information for identifying the tracked object.

(16)

The image processing device according to any one of (12) to (15),
  wherein the reception processing unit receives information on a movement direction of the tracking target object from the other image processing device, and
  the tracking control unit performs control for the tracking using a predicted position of the tracking target object calculated based on a capture time of the first image and the movement direction received.

(17)

The image processing device according to any one of (12) to (16), further including:
  a switching processing unit that switches between a first mode in which processing by the transmission processing unit, and processing by the tracking control unit that performs tracking control for tracking an object identified based on newly-obtained information on the tracking target object, and a second mode in which control of the tracking is continued without changing the tracking target object.

(18)

The image processing device according to (17),
  wherein the switching processing unit switches between the first mode and the second mode according to a movement mode of the tracked object tracked by the tracking control unit.

(19)

The image processing device according to any one of (12) to (18), further including: the second image capturing unit.

(20)

An image processing system including:
  a tracking target object determination unit that determines an object targeted for tracking as a tracking target object based on a first image captured by a first image capturing unit;
  a tracking control unit that controls tracking of an object by a second image capturing unit using information on the tracking target object;
  a tracked object identification unit that identifies an object being tracked by the second image capturing unit as a tracked object based on information output by the tracking control unit;
  a determination processing unit that determines whether the tracking target object determined and the tracked object identified are a same object; and a tracking change processing unit that outputs, to the tracking control unit, information on the tracking target object, when the tracked object and the tracking target object are determined not to be the same, wherein the tracking control unit:

performs tracking control for tracking an object identified based on newly-obtained information on the tracking target object, when information about a tracking target object is input during control of the tracking; and controls the tracking without changing the tracking target object when information on the tracking target object is not input during the control of the tracking.

REFERENCE SIGNS LIST 1, 1A, 1B Image capturing system (image processing system)
2 Wide-angle camera (first image capturing unit, image processing device)
2A Wide-angle camera (first image capturing unit)
3 Telephoto camera (second image capturing unit, image processing device)
3A Telephoto camera (second image capturing unit)
4 First image capturing unit
6 Second image capturing unit
9 Tracking target object determination unit
10 Tracked object information obtainment unit
12 Tracked object identification unit
13 Determination processing unit
14 Movement direction estimation unit
15 Tracking change processing unit
16 Communication processing unit
17 Tracking control unit
18 Communication processing unit (reception processing unit, transmission processing unit)
21 Switching processing unit
22 Switching processing unit
23 Switching processing unit
31 First image processing device (image processing device)
41 Second image processing device (image processing device)
51 Third image processing device (image processing device)
GC1 First image
GC2 Second image
T1 Tracking target object
T2 Tracked object

The invention claimed is:

1. An image processing device comprising:
a tracking target object determination unit that determines an object targeted for tracking as a tracking target object based on a first image captured by a first image capturing unit;
a tracked object information obtainment unit that obtains information for identifying a tracked object that is an object being tracked by a second image capturing unit;
a determination processing unit that determines whether the tracked object and the tracking target object are a same object; and
a tracking change processing unit that performs processing for changing the tracked object tracked by the second image capturing unit to the tracking target object when the tracked object and the tracking target object are determined not to be the same.

2. The image processing device according to claim 1,
wherein the tracked object information obtainment unit obtains the information for identifying the tracked object from another image processing device, and the tracking change processing unit performs processing for transmitting information on the tracking target object to the other image processing device as the processing for changing.

3. The image processing device according to claim 2,
wherein the tracking change processing unit transmits information for changing an optical axis direction of the second image capturing unit to the other image processing device as the information on the tracking target object.

4. The image processing device according to claim 2,
wherein the tracking change processing unit lowers a frequency of processing for transmitting to the other image processing device when the tracked object and the tracking target object are determined to be the same.

5. The image processing device according to claim 2, further comprising:
a movement direction estimation unit that estimates a movement direction of the tracking target object,
wherein the tracking change processing unit performs processing for transmitting the movement direction in addition to the information on the tracking target object to the other image processing device as the processing for changing.

6. The image processing device according to claim 5,
wherein the movement direction estimation unit estimates the movement direction based on a past image captured by the first image capturing unit.

7. The image processing device according to claim 2,
wherein the determination processing unit determines whether the objects are the same using the first image selected based on a capture time of a second image, among second images captured by the second image capturing unit, from which information for identifying the tracked object is obtained.

8. The image processing device according to claim 2, further comprising:
a switching processing unit that switches between a first mode in which processing by the determination processing unit and processing by the tracking change processing unit are executed, and a second mode in which processing by the determination processing unit and processing by the tracking change processing unit are not executed.

9. The image processing device according to claim 8,
wherein the switching processing unit switches between the first mode and the second mode according to a movement mode of the tracking target object determined.

10. The image processing device according to claim 2, further comprising:
the first image capturing unit.

11. An image processing device comprising:
a tracking control unit that controls tracking of an object by a second image capturing unit using information on a tracking target object that is an object targeted for tracking determined based on a first image captured by a first image capturing unit,
wherein the tracking control unit:
outputs information for identifying a tracked object that is an object being tracked;
controls the tracking without changing the tracking target object when information on the tracking target object is not obtained during the control of the tracking; and
performs tracking control for tracking an object identified based on newly-obtained information on the tracking target object, when the information on the tracking target object is obtained during the control of the tracking.

12. The image processing device according to claim 11, further comprising:
a reception processing unit that receives information on the tracking target object from another image processing device; and
a transmission processing unit that transmits, to the other image processing device, the information for identifying the tracked object output by the tracking control unit,
wherein the tracking control unit:
controls the tracking without changing the tracking target object when the information on the tracking target object is not received by the reception processing unit during the control of the tracking; and
performs tracking control for tracking an object identified based on newly-obtained information on the tracking target object, when the information on the tracking target object is received by the reception processing unit during the control of the tracking.

13. The image processing device according to claim 12, wherein the transmission processing unit transmits information for identifying the tracked object each time a captured image is generated by the second image capturing unit.

14. The image processing device according to claim 12, wherein the transmission processing unit transmits information pertaining to an optical axis direction of the second image capturing unit as the information for identifying the tracked object.

15. The image processing device according to claim 12, wherein the transmission processing unit transmits a second image captured by the second image capturing unit as information for identifying the tracked object.

16. The image processing device according to claim 12, wherein the reception processing unit receives information on a movement direction of the tracking target object from the other image processing device, and
the tracking control unit performs control for the tracking using a predicted position of the tracking target object calculated based on a capture time of the first image and the movement direction received.

17. The image processing device according to claim 12, further comprising:
a switching processing unit that switches between a first mode in which processing by the transmission processing unit, and processing by the tracking control unit that performs tracking control for tracking an object identified based on newly-obtained information on the tracking target object, and a second mode in which control of the tracking is continued without changing the tracking target object.

18. The image processing device according to claim 17, wherein the switching processing unit switches between the first mode and the second mode according to a movement mode of the tracked object tracked by the tracking control unit.

19. The image processing device according to claim 12, further comprising:
the second image capturing unit.

20. An image processing system comprising:
a tracking target object determination unit that determines an object targeted for tracking as a tracking target object based on a first image captured by a first image capturing unit;
a tracking control unit that controls tracking of an object by a second image capturing unit using information on the tracking target object;
a tracked object identification unit that identifies an object being tracked by the second image capturing unit as a tracked object based on information output by the tracking control unit;
a determination processing unit that determines whether the tracking target object determined and the tracked object identified are a same object; and
a tracking change processing unit that outputs, to the tracking control unit, information on the tracking target object, when the tracked object and the tracking target object are determined not to be the same,
wherein the tracking control unit:
performs tracking control for tracking an object identified based on newly-obtained information on the tracking target object, when information about a tracking target object is input during control of the tracking; and
controls the tracking without changing the tracking target object when information on the tracking target object is not input during the control of the tracking.

* * * * *